(12) United States Patent
Weston-Lewis et al.

(10) Patent No.: US 12,299,439 B2
(45) Date of Patent: May 13, 2025

(54) SYSTEM AND METHOD FOR MANAGING INSTANCES OF APPLICATIONS

(71) Applicant: INFOSYS LIMITED, Bangalore (IN)

(72) Inventors: Sebastian Weston-Lewis, London (GB); Himanshu Gupta, Panchkula (IN)

(73) Assignee: Infosys Limited, Bangalore (IN)

( * ) Notice: Subject to any disclaimer, the term of this patent is extended or adjusted under 35 U.S.C. 154(b) by 144 days.

(21) Appl. No.: 18/127,225

(22) Filed: Mar. 28, 2023

(65) Prior Publication Data
US 2024/0329977 A1 Oct. 3, 2024

(30) Foreign Application Priority Data

Mar. 28, 2023 (IN) .............. 202341022521

(51) Int. Cl.
| | | |
|---|---|---|
| *G06F 9/455* | (2018.01) | |
| *G06F 8/65* | (2018.01) | |
| *G06F 8/71* | (2018.01) | |
| *G06F 9/06* | (2006.01) | |
| *G06F 9/445* | (2018.01) | |
| *G06F 11/36* | (2006.01) | |
| *G06F 15/16* | (2006.01) | |

(52) U.S. Cl.
CPC . *G06F 8/71* (2013.01); *G06F 8/65* (2013.01)

(58) Field of Classification Search
CPC ..... G06F 8/71; G06F 8/65; G06F 8/75; G06F 8/72; G06F 8/33; G06F 11/3604; G06F 9/455; G06F 8/54; G06F 9/44536; G06F 8/61; G06F 11/1433; G06F 8/658; G06F 8/62; H04L 67/62; H04L 69/16; H04L 69/163
See application file for complete search history.

(56) References Cited

U.S. PATENT DOCUMENTS 9,336,208 B2 * 5/2016 Dujmovic ........... G06F 11/2058
9,400,645 B2 * 7/2016 Mahajan .................. G06F 8/43

* cited by examiner

*Primary Examiner* — Thuy Dao
(74) *Attorney, Agent, or Firm* — Finnegan, Henderson, Farabow, Garrett & Dunner LLP

(57) ABSTRACT

The disclosure relates to system and method for managing a plurality of applications. The method includes receiving a first input for customization of a master map associated with the plurality of applications. The master map includes a plurality of components and a set of control settings for each of the plurality of components. The method further includes modifying, in the master map, a status of a first control setting for a first component based on the first input; updating each of the plurality of applications based on the modified status of the first control setting in the master map; and modifying a configuration code associated with the each of the plurality of applications, based the update in each of the plurality of applications.

20 Claims, 21 Drawing Sheets

---

400

Add, in the master map, a new component to the plurality of components and a new set of control settings for the new component 402

↓

Update the each of the plurality of applications based on addition of the new component and the new set of control settings 404

↓

Modify the configuration code associated with the each of the plurality of applications based on updating the each of the plurality of applications 406

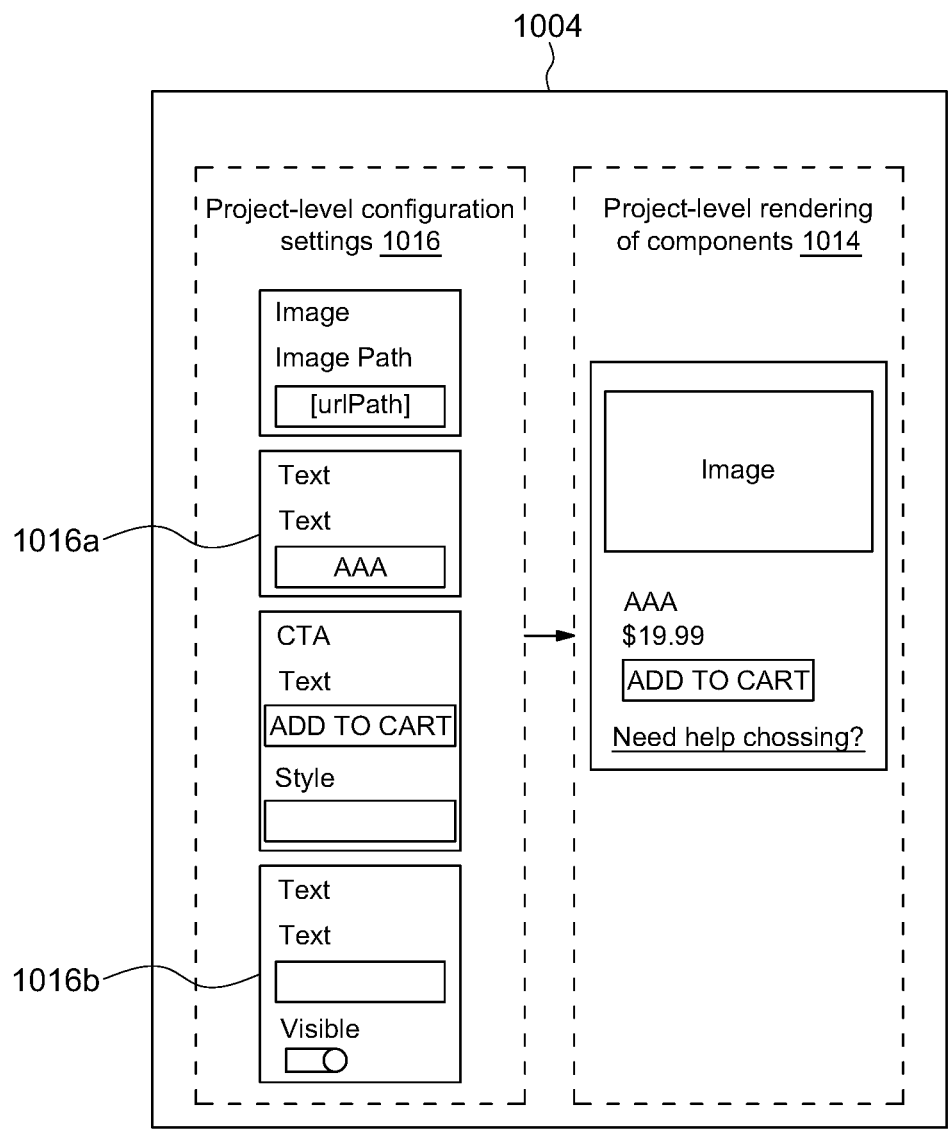
FIG. 10 (Contd.)

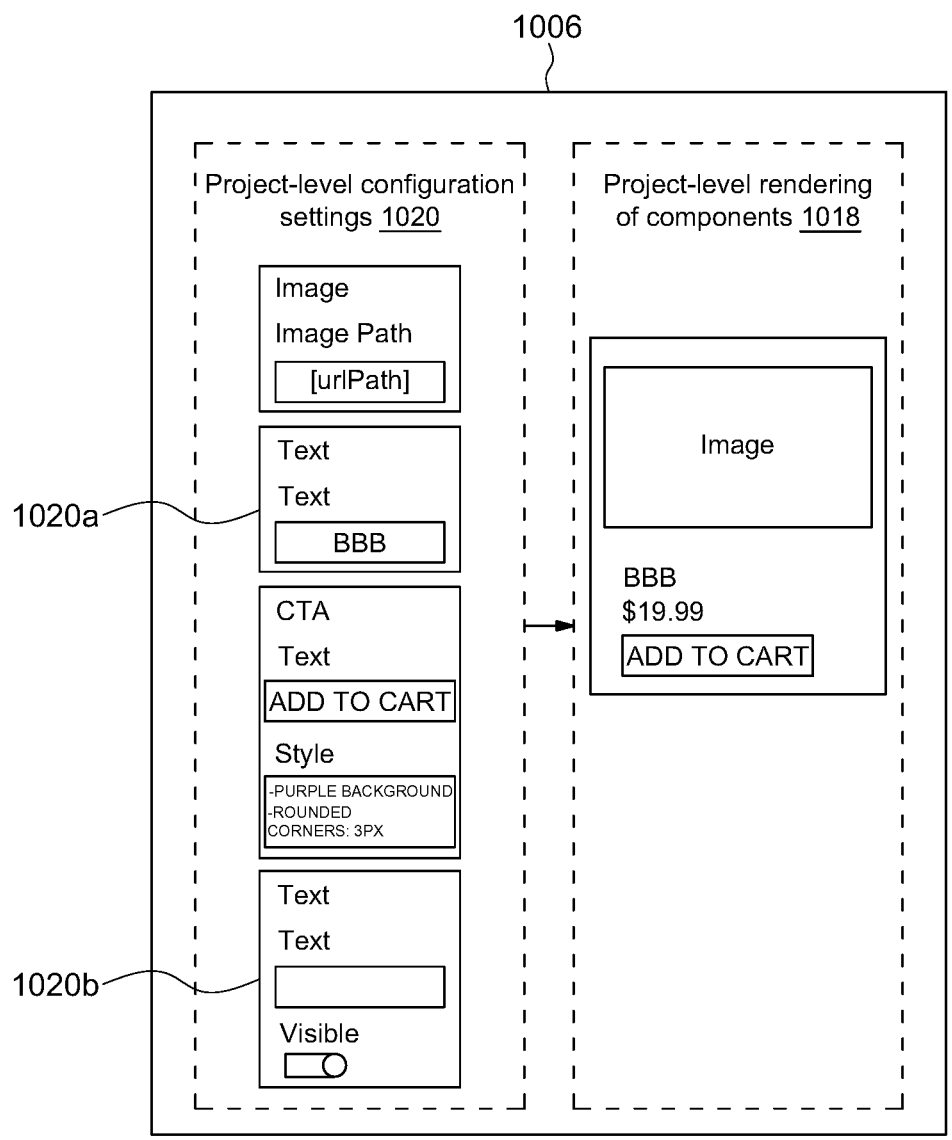
FIG. 10 (Contd.)

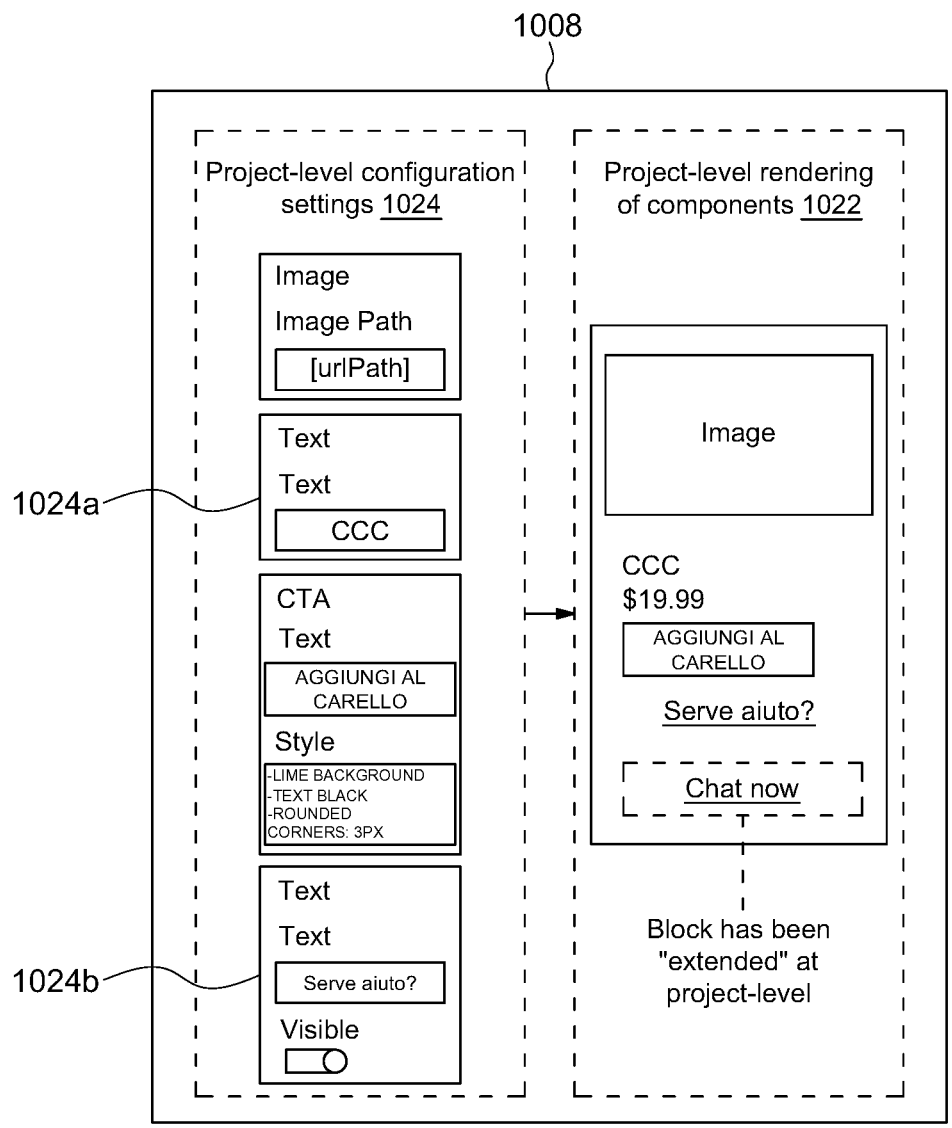
FIG. 10 (Contd.)

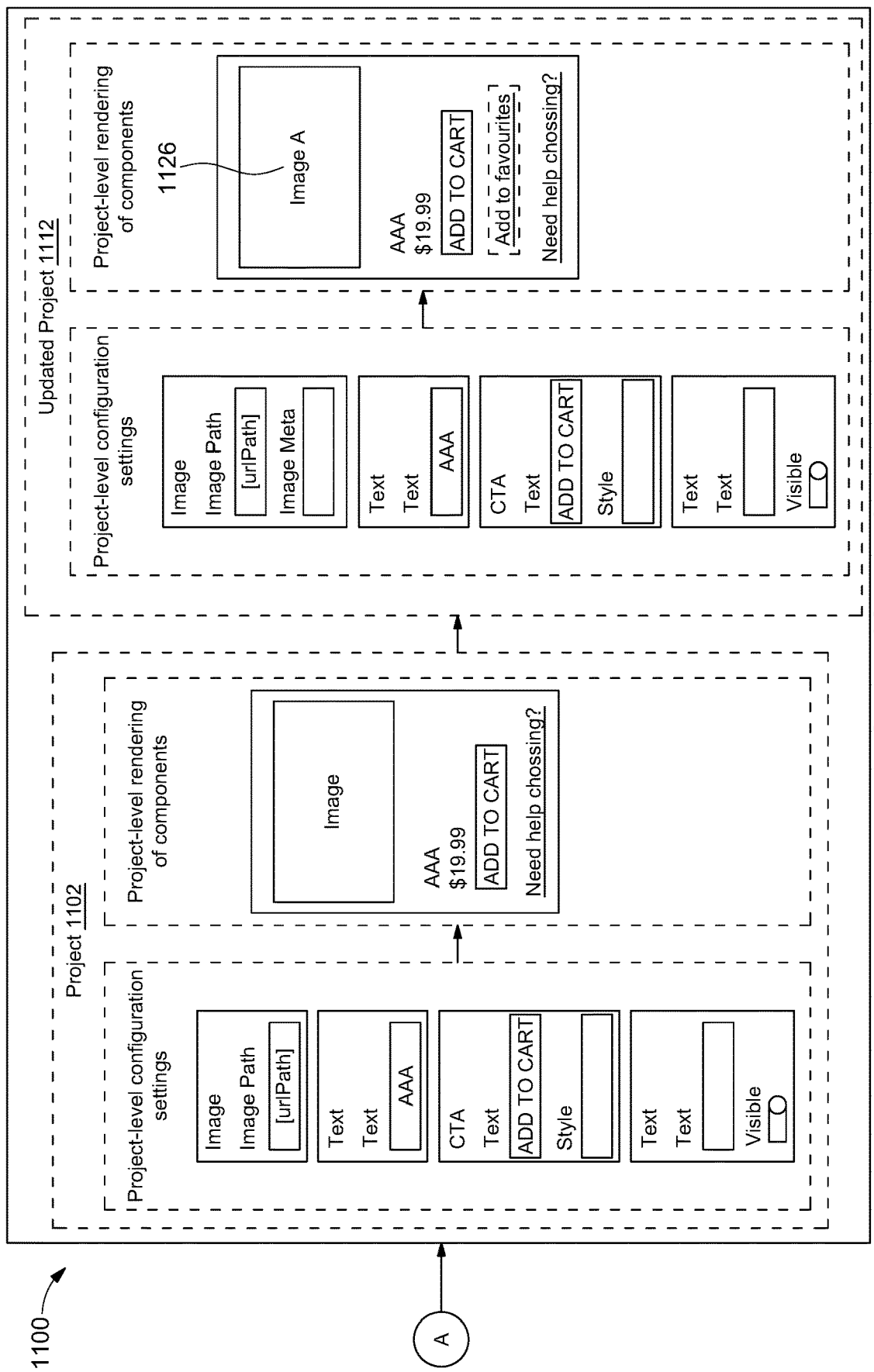
FIG. 11 (Contd.)

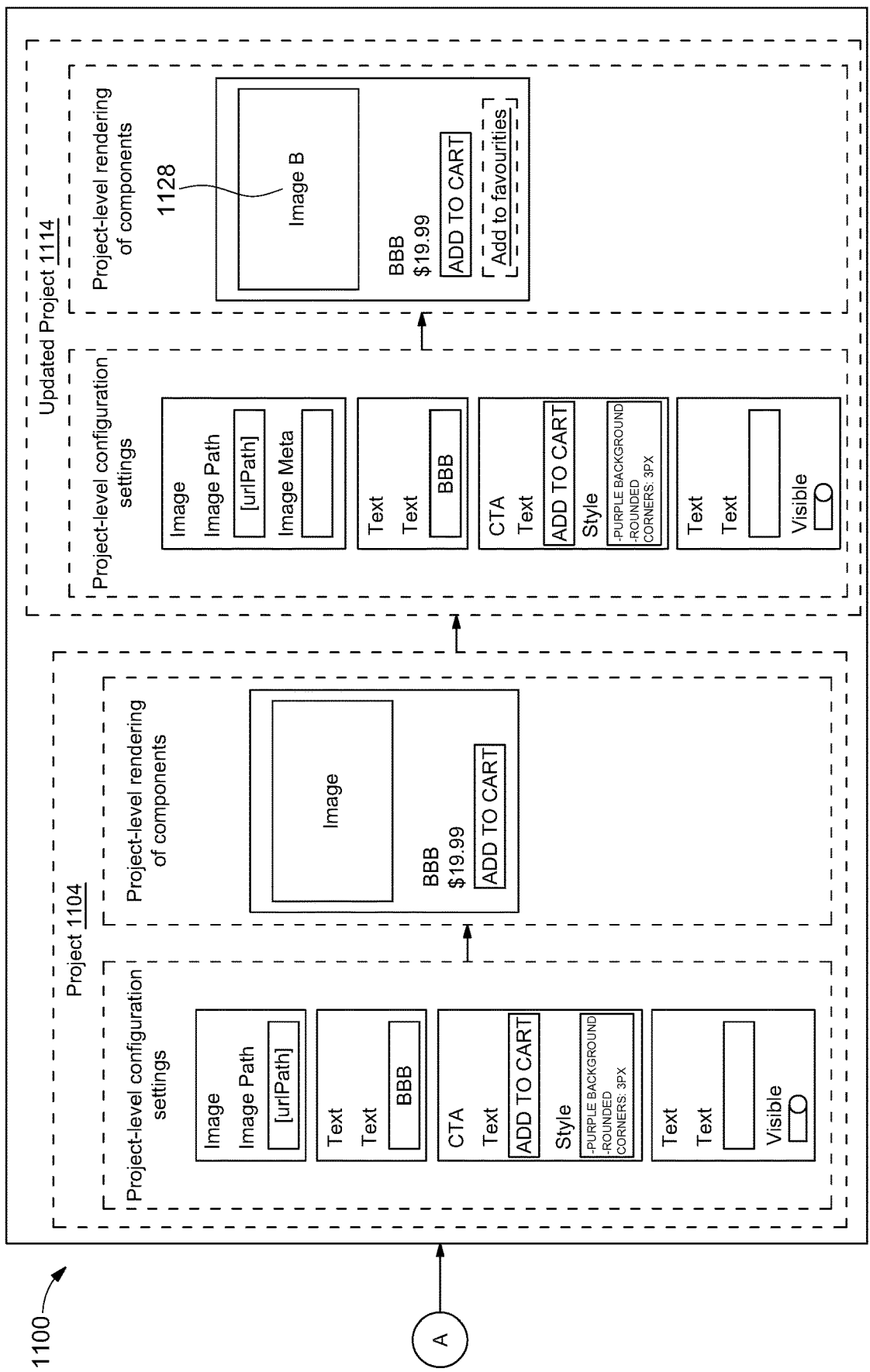
FIG. 11 (Contd.)

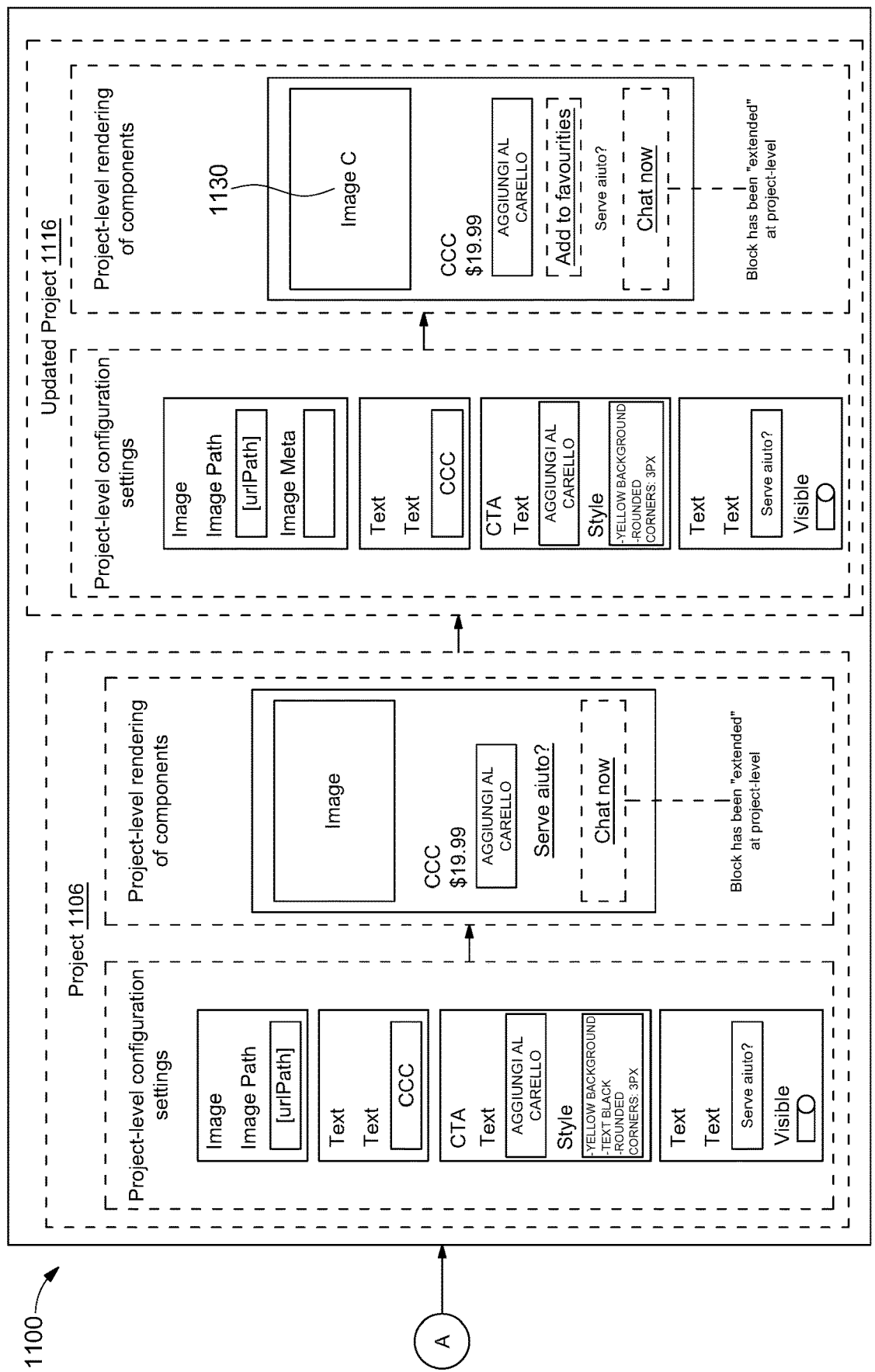
FIG. 11 (Contd.)

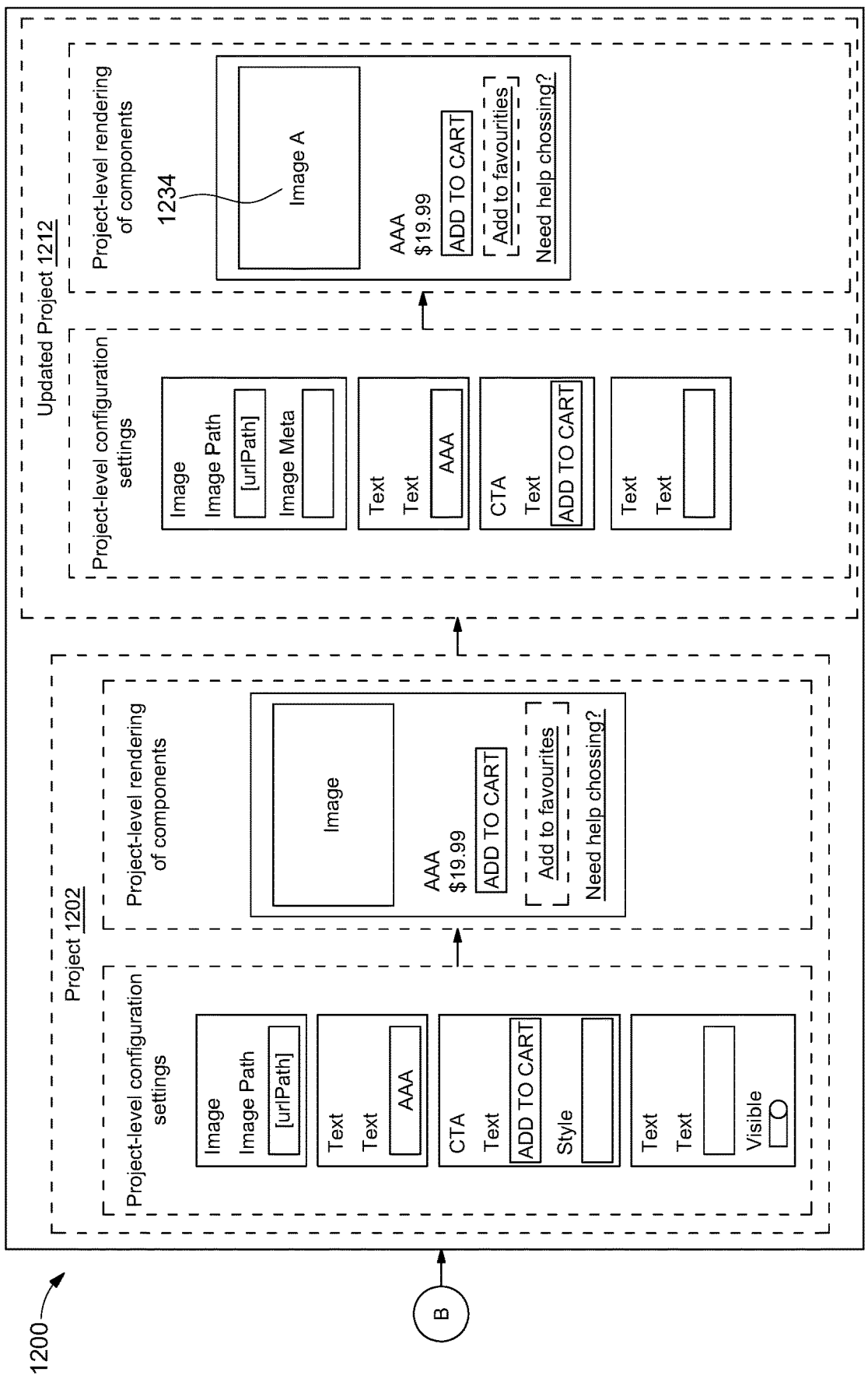
FIG. 12 (Contd.)

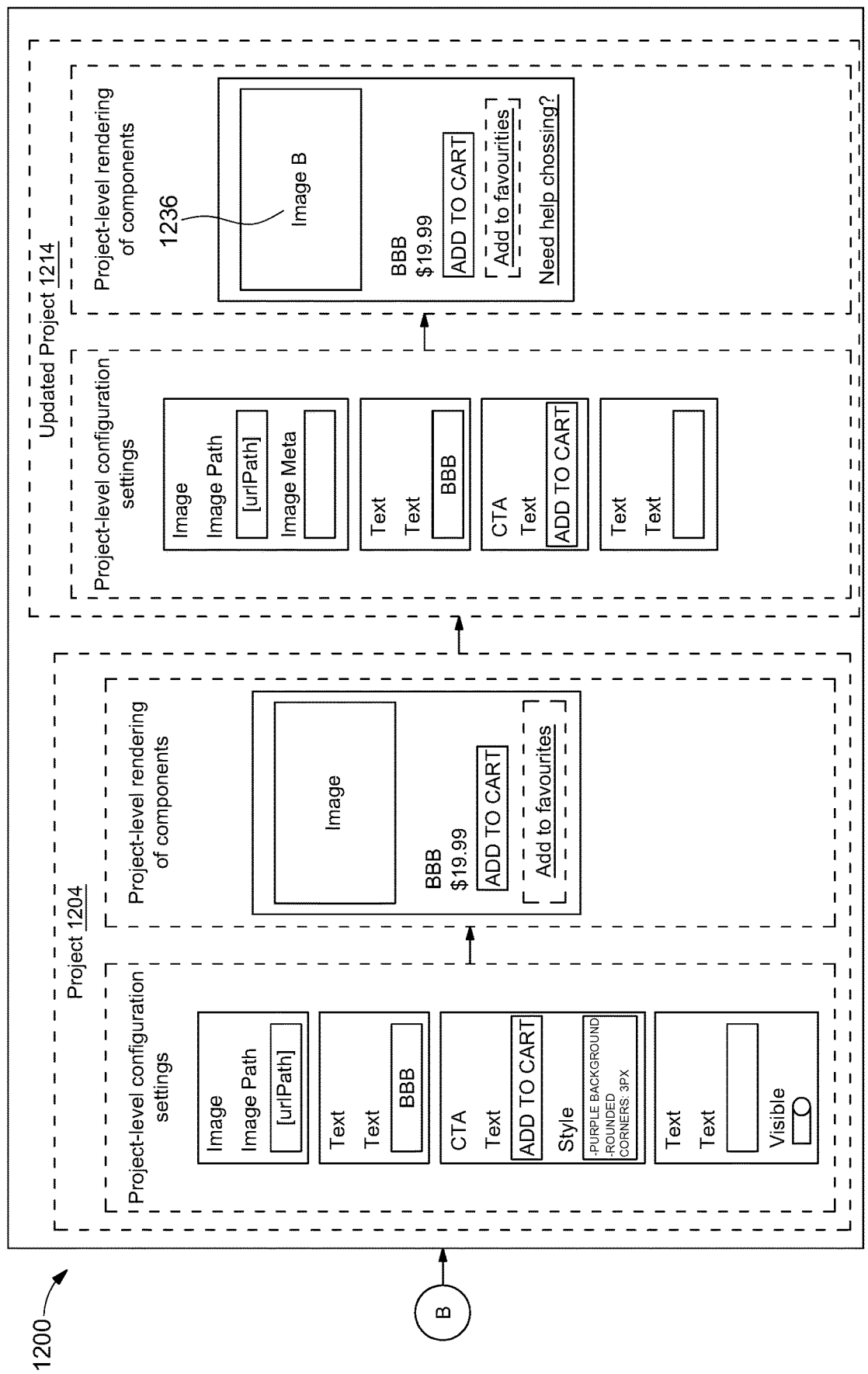
FIG. 12 (Contd.)

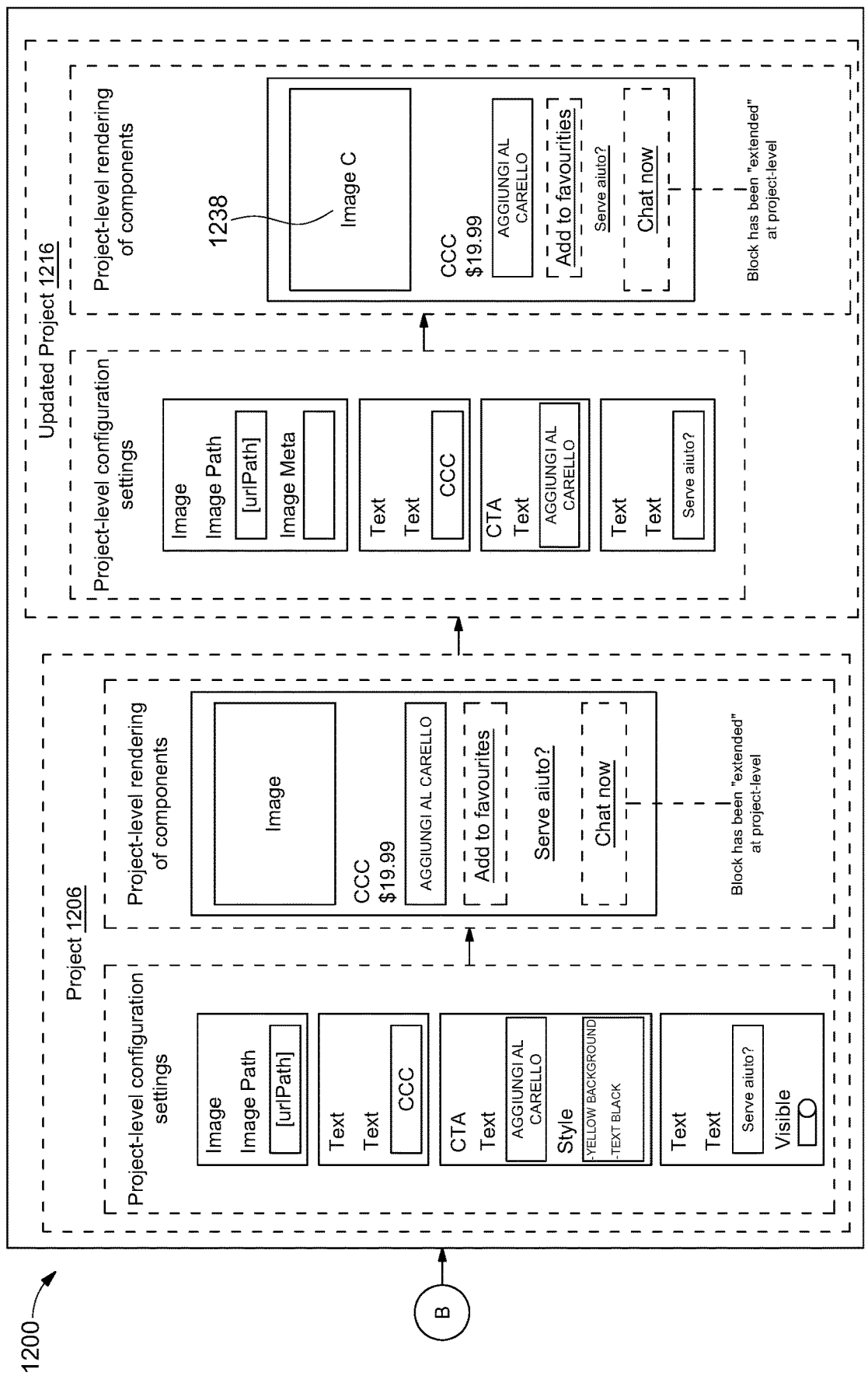
FIG. 12 (Contd.)

SYSTEM AND METHOD FOR MANAGING INSTANCES OF APPLICATIONS

CROSS-REFERENCE TO RELATED APPLICATION

This application claims priority of Indian Patent Application No. 202341022521, filed Mar. 28, 2023, which is hereby incorporated by reference in its entirety.

TECHNICAL FIELD

The present disclosure relates to computer applications, and more particularly to system and method for managing a plurality of applications.

BACKGROUND

Computer applications have become more complex due to the presence of many interacting components and their dependencies. Therefore, without any clear plan, management of the computer applications is difficult. Additionally, because of the development of cloud computing and containerization technologies, the management of the computer applications has become more difficult. To overcome these difficulties, blueprints have been developed that include methods for managing the computer applications in cloud environments. The blueprints include designs or complete plans, frame structures, components, and functionalities of the computer applications. The blueprints provide an overview of application architectures and are frequently generated for managing development processes. Also, the blueprints provide an ability to manage application resources, keep monitor performance, and scale up or down the computer applications as required. Thus, in today's fast changing technical environment, the blueprints provide an essential framework for managing the computer applications, ensuring efficiency, reliability, and scalability.

For better management, current systems include a blueprint for multiple computer applications, however, a problem with current systems is that any update in a master codebase of the blueprint require individual update in each derivative replica codebase of the computer applications, as synchronization is linear between the master codebase and replica codebase. Moreover, when a large number of derivative replicas is required, infrastructure footprint may increase exponentially. Configurations of the computer applications may be saved as an override/overwrite within the replica codebase of the computer applications. Any update in the master codebase may result in destructive conflicts with the local configurations of the computer applications.

The present invention is directed to overcome one or more limitations stated above or any other limitations associated with the known arts.

SUMMARY

In one embodiment, a method of managing a plurality of applications is disclosed. In one example, the method may include receiving a first input for customization of a master map associated with the plurality of applications. The master map may include a plurality of components and a set of control settings for each of the plurality of components. The method may further include modifying, in the master map, a status of a first control setting for a first component based on the first input. The method may further include updating each of the plurality of applications based on the modified status of the first control setting in the master map. The method may further include modifying a configuration code associated with the each of the plurality of applications, based the update in each of the plurality of applications.

In another embodiment, a system for managing a plurality of applications is disclosed. In one example, the system may include a processing circuitry and a memory communicatively coupled to the processing circuitry. The memory may store processor-executable instructions, which, on execution, may cause the processing circuitry to receive a first input for customization of a master map associated with the plurality of applications. The master map may include a plurality of components and a set of control settings for each of the plurality of components. The processor-executable instructions, on execution, may further cause the processing circuitry to modify, in the master map, a status of a first control setting for a first component based on the first input. The processor-executable instructions, on execution, may further cause the processing circuitry to update each of the plurality of applications based on the modified status of the first control setting in the master map. The processor-executable instructions, on execution, may further cause the processing circuitry to modify a configuration code associated with the each of the plurality of applications, based the update in each of the plurality of applications.

In yet another embodiment, a non-transitory computer-readable medium storing computer-executable instruction for managing a plurality of applications is disclosed. The stored instructions, when executed by a processing circuitry, may cause the processing circuitry to perform operations including receiving a first input for customization of a master map associated with the plurality of applications. The master map may include a plurality of components and a set of control settings for each of the plurality of components. The operations may further include modifying, in the master map, a status of a first control setting for a first component based on the first input. The operations may further include updating each of the plurality of applications based on the modified status of the first control setting in the master map. The operations may further include modifying a configuration code associated with the each of the plurality of applications, based the update in each of the plurality of applications.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
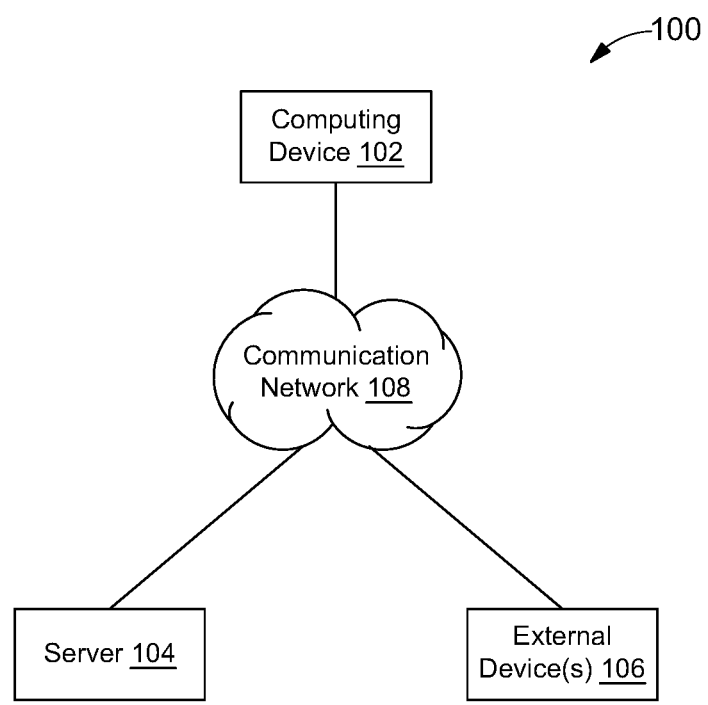
FIG. 1 illustrates a block diagram of an environment for managing a plurality of applications, in accordance with an exemplary embodiment of the present disclosure.

FIG. 1 is a block diagram that illustrates an environment 100 for managing a plurality of applications, in accordance with an exemplary embodiment of the present disclosure. The environment 100 may include a computing device 102, a server 104, and one or more external device(s) 106.

Examples of the computing device 102 may include, but are not limited to a server, a smartphone, an application server, a laptop, a desktop, a mobile phone, a smart wearable, or the like. The computing device 102 may be configured to manage the plurality of applications. The plurality of applications may correspond to computer applications including web applications, mobile applications, or web pages. The plurality of applications may also be referred to as an application program or an application software. An application may be a computer software package executing a particular function for an end user or, sometimes, for other applications. The plurality of applications may be associated with a company, an enterprise, a service provider, or the like. The plurality of applications may be, but is not limited to, shopping applications, gaming applications, social media applications, entertainment applications, or the like.

Further, to manage the plurality of applications, the computing device 102 may perform various operations. For example, the operations may include receiving inputs, adding components, adding control settings, modifying control settings, updating a master map, updating applications and configuration codes, and the like. The master map may correspond to a blueprint or a sitemap that may be created by mapping the components of the plurality of applications to a resource template. The master map may provide a pattern for an environment. The components may include, but are not limited to, an image, a text, a dynamic text, a block including the text, or the like.

For example, the components of the master map powering one or more shopping applications may include an image of a product, a name of the product, a price of the product, a block including the text "Add to cart", a link of "need help", and a rating of the product. It should be noted that the components within the master map may be present in the plurality of applications. For example, the components within the master map of the one or more shopping applications (i.e., the image of the product, the name of the product, the price of the product, the block including the text "Add to cart", the link of "need help", and the rating of the product) may be present in each of the one or more shopping applications.

It should be noted that each component may have a set of control settings. For example, in continuation to the previous example of the one or more shopping applications, the set control settings for the image of the product (i.e., the component) may include "set image path" and "set image meta". The set of control settings for the block "Add to cart" (i.e., the component) may include "set text" and "set style".

The inputs may be additive inputs, subtractive inputs, modification inputs, or combination of one or more of these inputs. With regards to an additive input, in some embodiments, the computing device 102 may add a component and associated control settings to the master map, and update each of the plurality of applications based on addition of the component and the associated control settings, when the additive input is received. With regards to a subtractive input, in some embodiments, the computing device 102 may eliminate the component, and the associated control settings from the master map and update each of the plurality of applications based on elimination of the component and the associated control settings, when the subtractive input is received.

With regards to a modification input, in some embodiments, the computing device 102 may modify a status of a control setting for the component in the master map, and update each of the plurality of applications based on the modification of the status of the control setting, when the modification input is received. The status of the control setting may be a "true status" (such as, an activated status or an enabled status), or a "false status" (such as, a deactivated status or a disabled status). For example, the computing device 102 may modify the status of the control setting from the "true status" to the "false status", or from the "false status" to the "true status". The "true status" of the control setting means enablement/activation of that control setting and false status means disablement/deactivation of that control setting. In some embodiments, the computing device 102 may include an input/output device which may further include a user interface (not shown in FIG. 1). By way of an example, the user interface may be used by user(s) to provide inputs to the computing device 102. For example, for providing the additive inputs, the subtractive inputs, the modification inputs, application level changes etc., to the computing device 102. In some other embodiments, the user(s) may provide inputs to the computing device 102 through the external device(s) 106. The computing device 102 is further explained in detail in conjunction with FIG. 2.

The computing device 102, the server 104, and the external device(s) 106 are configured to communicate with each other via a communication network 108 for sending and receiving various data. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

By way of an example, in some embodiments, the computing device 102 may receive information from the server 104 or the one or more external device(s) 106. The server 104 may further include a database (not shown in FIG. 1), which may store information such as, configuration codes, different versions of master maps and applications, etc. Further, the one or more external device(s) 106 may include, but may not be limited to a desktop, a laptop, a notebook, a netbook, a tablet, a smartphone, a remote server, a mobile phone, a smartwatch, any other similar device. The one or more external device(s) 106 may be used by the user(s) to access an application.

The external device(s) 106 may include a display which further includes a user interface (not shown in FIG. 1). By way of an example, the display may be used to display results of analysis performed by the computing device 102 (for example, for displaying updated applications, or for displaying blueprints, and the like), to the user(s). By way of another example, the user interface of the display may be used by the user(s) to provide inputs (for example, for providing application level changes, for providing the additive inputs, the subtractive inputs, the modification inputs, an input for modification in a feature corresponding to a component) to the computing device 102. With regards to the modification in the feature, when the status of the control setting corresponding to the component is the true status, the user(s) may be able to change the feature corresponding to the component in the plurality of applications by providing the input.

By way of an example, with reference to the example of one or more shopping applications, if the status of the control setting "set text" is the "true status" for the component "Add to cart", then the user(s) may be able to modify the text of the component "Add to cart" in the plurality of applications by providing a different text as the input for modification in the feature corresponding to the component. In some embodiments, the user(s) may provide the input to change the text in one application of the plurality of applications. In some embodiments, the user(s) may provide the input to change the text in more than one application of the plurality of applications. In some other embodiments, the user(s) may provide the input to change the text in the plurality of applications.

For example, consider a scenario where three applications are powered by the master map, and the status of the control setting "set text" is the "true status" for the component "Add to cart". In that case, the user(s) may provide the input in such a way that the text "Add to cart" may be changed to "choose the product" in a first application, the text "Add to cart" may be changed to "Add to basket" in a second application, and the text "Add to cart" may not be changed (i.e., remained as the text "Add to cart") in a third application. By way of another example, if the status of a control setting "set visibility" corresponding to the component "need help" is the "true status", in that case the user(s) may be able to modify visibility of the component "need help" in the plurality of applications.

Figure 2:
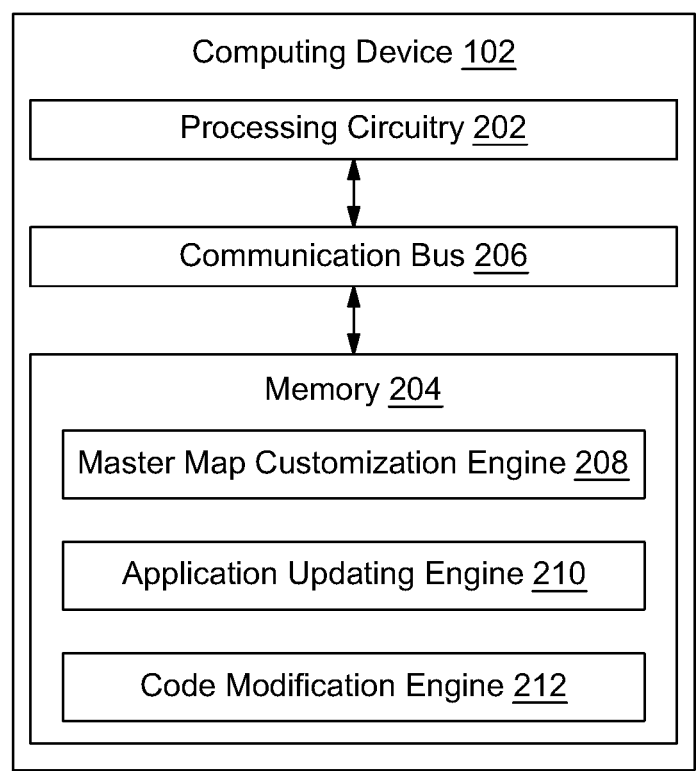
FIG. 2 illustrates a block diagram of a computing device configured for managing a plurality of applications, in accordance with some embodiments of the present disclosure.

FIG. 2 is a block diagram that illustrates the computing device 102 configured for managing a plurality of applications, in accordance with an exemplary embodiment of the present disclosure. FIG. 2 is explained in conjunction with FIG. 1. The computing device 102 may include a processing circuitry 202, and a memory 204 communicatively coupled to the processing circuitry 202 via a communication bus 206.

The memory 204 may store various data that may be captured, processed, and/or required by the computing device 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 may also store processor-executable instructions. The processor-executable instructions, when executed by the processing circuitry 202, may cause the processing circuitry 202 to implement one or more embodiments of the present disclosure such as, but not limited to, receiving inputs, updating a master map (i.e., a blueprint) based on the inputs, updating the plurality of applications and subsequently associated configuration codes, and the like. The memory 204 may include a master map customization engine 208, an application updating engine 210, and a code modification engine 212. The memory 204 may also include a data store (not shown in FIG. 2) for storing data and intermediate results generated by the engines 208-212.

The master map customization engine 208 in conjunction with the processing circuitry 202 may be configured to receive an input (for example a first input) for customization of the master map. The input may be received from a user or a system. It should be noted that the master map may power the plurality of applications. The master map may correspond to the blueprint/the sitemap created by mapping the components of the plurality of applications to a resource template. Also, it should be noted that the master map may include a plurality of components and a set of control settings for each of the plurality of components. The plurality of components may include, but are not limited to, an image, a text, a dynamic text, a block including the text, or the like. By way of an example, the master map powering shopping applications may include components such as an image of a product, a name of the product, a price of the product, a block including the text "Add to cart", a link of "need help", and a rating of the product. Further, the set control settings for the component "image of the product" may include "set image path" and "set image meta". Similarly, the set of control settings for the component "Add to cart" may include "set text" and "set style".

The input may be a modification input related to a status of a control setting for a component. For example, the first input may be related to the status of a first control setting for the first component. Further, in some embodiments, the input may be an additive input related to the component and associated control setting. Additionally, in some embodiments, the input may be subtractive input related to the component and associated control setting.

Further, the master map customization engine 208 in conjunction with the processing circuitry 202 may be configured to customize the master map based on the received input. In order to customize the master map, in some embodiments, the status of the control setting for the component may be modified based on the modification input. With reference to the first input, the status of a first control setting for a first component may be modified based on the first input. The status of the control setting may be a true status or a false status. The true status may correspond to an activated/enabled status, and the false status may correspond to a deactivated/disabled status. For example, the status may be either modified from the true status to the false status, or from the false status to the true status based on the input. By way of an example, consider that a current status of a control setting "set visibility" corresponding to the component "need help" is the "true status". Further, the modification input (to change the visibility status from the true status to the false status) may be received by the master map customization engine 208. In that case, the master map customization engine 208 may modify the status of the visibility to the "false status" and hence customize the master map.

Further, when the status of the control setting is modified to the "true status" or activated, each of the plurality of applications may get an authorization to access the component associated with the control setting via the configuration code associated with the each of the plurality of applications. In other words, the each of the plurality of applications get the authorization to modify the component with respect that control setting (with the true status). When an application has an authorization, a user may be able to modify the feature associated with the component when required. The feature may be modified via the configuration code of the application of the plurality of applications based on a user requirement. Further, the application may be updated based on the configuration code.

For example, consider one scenario where three applications are powered by the master map, and the status of the control setting "set text" is activated or changed to the "true status" for the component "Add to cart". In that case, the user may be able to modify the text "Add to cart" to "choose the product" in a first application, the text "Add to cart" to "Add to basket" in a second application and may not change the text "Add to cart" (i.e., remained as the text "Add to cart") in a third application. Further, in case the status is changed to the "false status" from the "true status", all the modifications may be reverted. Which means the text "choose the product" in the first application may be again changed to the original text "Add to cart" and the text "Add to basket" may also be changed to the original text "Add to cart".

As the each of the plurality of applications have the authorization to access the component, when the status of the control setting is modified to the "false status" or deactivated from the "true status", the authorization may be withdrawn or removed from the each of the plurality of applications and the each of the plurality of applications may be restricted to change any feature of the component associated with that control setting. In continuation to the previous example of three applications, consider that the status of the control setting "set text" is deactivated or the "false status" for the component "Add to cart". In that case, even if the user wants to modify the text "Add to cart" to "choose the product" in the first application, and the text "Add to cart" to "Add to basket" in the second application, the user may not be able to perform the modifications as the status of the control setting is the "false status" and the applications do not have authorization this time. For all the three applications the text of the component may be "Add to cart" until the control setting "set text" is activated or the status of the control setting "set text" is changed to the "true status".

In order to customize the master map, in some other embodiments, a new component may be added to the plurality of components of the master map, when the additive input is received. Consecutively, a new set of control settings for the new component may be added to the master map. Additionally, in order to customize the master map, in some embodiments, an existing component within the plurality of components may be eliminated from the master map, when the subtractive input is received. Consecutively, the set of control settings for the existing components may be eliminated from the master map. The master map customization engine 208 may be operatively coupled to the application updating engine 210.

The application updating engine 210 in conjunction with the processing circuitry 202 may be configured to update each of the plurality of applications in-real time based on the customized master map. In some embodiments, the each of the plurality of applications may be updated based on the modified status of the first control setting in the master map. In some embodiments, the each of the plurality of applications may be updated based on addition of the new component and the new set of control settings. Additionally, in some embodiments, the each of the plurality of applications may be updated based on elimination of the existing component and the set of control settings.

In some embodiments, the application updating engine 210 may retrieve a latest version of the customized master map and a last saved version of the configuration code associated with the each of the plurality of applications from a respective database schema. Further, the latest version of the customized master map may be compared with the last saved version of the configuration code associated with the each of the plurality of applications. As a result, one or more changes in the customized master map from the each of the plurality of applications may be identified. The one or more changes may be identified based on a deterministic algorithm and a contextual algorithm. The deterministic algorithm and the contextual algorithm are further explained in conjunction with FIGS. 13A and 13B. Hence, the each of the plurality of applications may be updated based on the one or more changes identified in the customized master map. While updating the each of the plurality of applications, in some embodiments, the configuration code associated with the each of the plurality of applications may be synchronized. The application updating engine 210 may be communicatively coupled to the code modification engine 212.

The code modification engine 212 in conjunction with the processing circuitry 202 may be configured to modify a configuration code associated with the each of the plurality of applications based on updating the each of the plurality of applications. It should be noted that in some embodiments, first the each of the plurality of applications are updated in real-time and then the configuration code associated with the each of the plurality of applications is updated, when the each of the plurality of applications is reloaded. Alternatively, in some embodiments, first the configuration code associated with each of the plurality of applications may be modified and as a result the plurality of applications may be updated.

It should be noted that all such aforementioned engines 208-212 may be represented as a single module or a combination of different modules. Further, as will be appreciated by those skilled in the art, each of the engines 208-212 may reside, in whole or in parts, on one device or multiple devices in communication with each other. In some embodiments, each of the engines 208-212 may be implemented as dedicated hardware circuit comprising custom application-specific integrated circuit (ASIC) or gate arrays, off-the-shelf semiconductors such as logic chips, transistors, or other discrete components. Each of the engines 208-212 may also be implemented in a programmable hardware device such as a field programmable gate array (FPGA), programmable array logic, programmable logic device, and so forth. Alternatively, each of the engines 208-212 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing applications. For example, the exemplary computing device 102 may manage the applications by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some or all of the processes described herein may be included in the one or more processors on the computing device 102.

Figure 3:
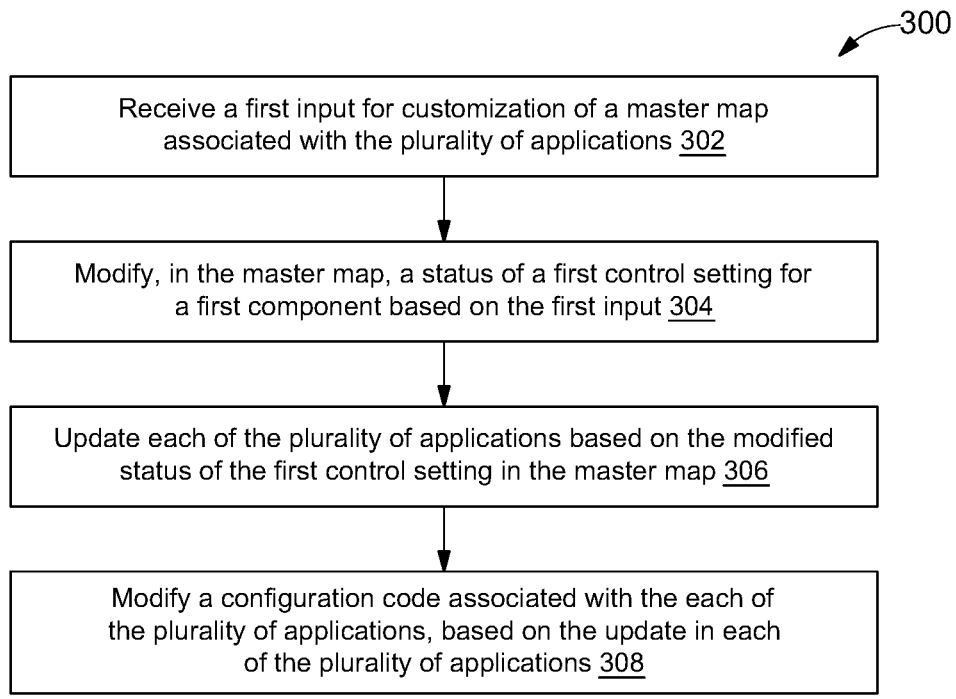
FIG. 3 illustrates a flow diagram of an exemplary process for managing a plurality of applications, in accordance with some embodiments of the present disclosure.

FIG. 3 is a flow diagram 300 that depicts an exemplary process for managing a plurality of applications, in accordance with an exemplary embodiment of the present disclosure. Each step of the process may be executed by the computing device 102. FIG. 3 is explained in conjunction with FIGS. 1-2.

At step 302, a first input for customization of a master map may be received. The master map may be associated with the plurality of applications. The master map may include a plurality of components and a set of control settings for each of the plurality of components. It should be noted that the first input may be a modification input related to a control setting for a component. For example, the first input may be "activate the control setting" or "deactivate the control setting".

At step 304, a status of a first control setting for a first component may be modified in the master map based on the first input. This step may be performed by the master map customization engine 208. The status may be a "true status" or a "false status". The "true status" may correspond to activated/enabled status and the "false status" corresponds to deactivated/disabled status. For example, consider that initially the status of the first control setting is the "false status". Then the input "activate the control setting" is received for the first control setting corresponding to the first control element. At that time the computing device 102 may change the status of the first control setting from the "false status" to the "true status", based on the input "activate the control setting". Similarly, initially if the status of the first control setting is the "true status" and the input "deactivate the control setting" is received for the first control setting corresponding to the first control element. At that time the computing device 102 may change the status of the first control setting from the "true status" to the "false status", based on the input "deactivate the control setting".

Thereafter, at step 306, each of the plurality of applications may be updated based on the modified status of the first control setting in the master map. This step may be performed by the application updating engine 210. For example, after changing the status of the first control setting is changed from the "false status" to the "true status", the plurality of applications may be updated. Previously, before modification of the status (i.e., when the status of the first control setting is the "false status"), the plurality of applications may not have an authorization to access the first component or restricted to access the first component. Thus, modification in a feature associated with the first component may not be performed at application level. Now, when the status is changed to the "true status", the plurality of applications gets the authorization to access the first component via the configuration code associated with the each of the plurality of applications. Thus, modification in the feature associated with the first component may be performed at application level, when required.

Further, if a second input "deactivate the control setting" is received for the first component and the status is again changed to the "false status" in the master map, then the modification in the feature associated with the first component may be reverted from the application. Updating of the plurality of applications is further explained in detail in conjunction with FIG. 6. At step 308, a configuration code associated with the each of the plurality of applications may be modified. This step may be performed by the code modification engine 212. The configuration code may be modified based on the update in each of the plurality of applications.

By way of an example, consider a master map associated with two exemplary web pages (login pages) which may include components "Email or phone", "password", "forgot email?", and "learn more". Each of these components may have the set of control settings. The first control setting corresponding to the component "password" may be "set text". Initially, status of the first control setting "set text" for the component "password" may be "false status", and the status may be changed to the "true status" in the master map when the modification input "activate the control setting" for the first control setting "set text" is received. Thus, both the web pages may get the authorization to access the component "password" and may be able to modify the feature (i.e., the text of the component "password") at their level. In one web page, the text of the component "password" may be changed to "Enter your password". In another web page, the text may not be changed.

Figure 4:
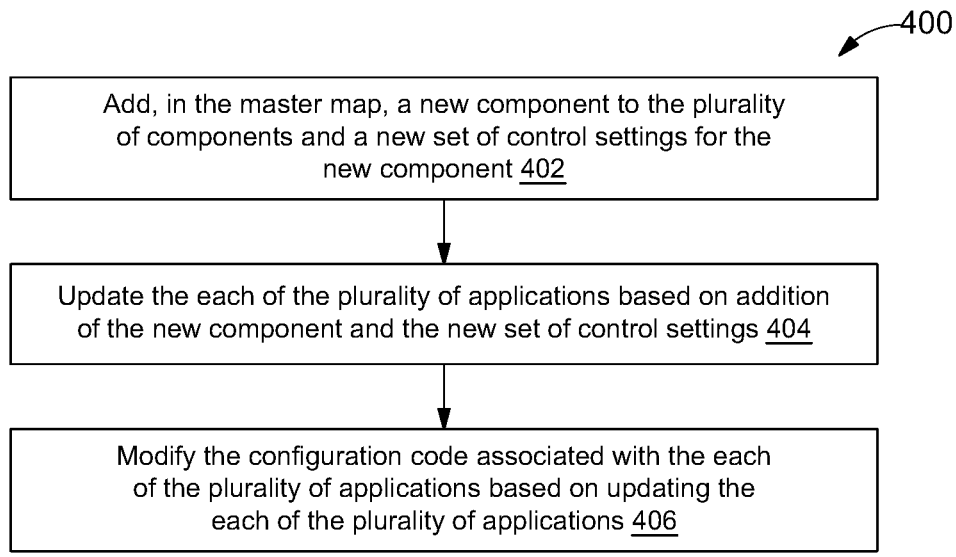
FIG. 4 illustrates a flow diagram of an exemplary process for adding components and control settings in a master map, in accordance with some embodiments of the present disclosure.

FIG. 4 is a flow diagram 400 that depicts an exemplary process for adding components and control settings in a master map, in accordance with an exemplary embodiment of the present disclosure. Each step of the process may be executed by the computing device 102. FIG. 4 is explained in conjunction with FIGS. 1-3.

At step 402, a new component may be added to the plurality of components of the master map and a new set of control settings for the new component may be added in the master map. This step may be performed by the master map customization engine 208. In some embodiments, an additive input may be received. The additive input may be "add the new component and the corresponding new set of control setting". Further, based on the input, the new component and the new set of control setting may be added in the master map.

With reference to the FIG. 3, for example, the master map (with the components "Email or phone", "password", "forgot email?", and "learn more") receives the additive input to add the new component "create account" and the new set of control setting that includes control settings "set text" and "set visibility". At that time, the component "create account" and the control settings "set text" and "set visibility" may be added to the master map. Further, a customized master map after addition may include the components "Email or phone", "password", "forgot email?", "learn more", and "create account". It should be noted that each of these components may have the corresponding set of control setting (for example, the component "create account" has the control settings "set text" and "set visibility").

At step 404, the each of the plurality of applications may be updated. It should be noted that the each of the plurality of applications may be updated based on addition of the new component and the new set of control settings. This step may be performed by the application updating engine 210. In other words, the new component may be reflected in the plurality of applications, and based on the status (i.e., the true status or the false status) of the set of new control setting in the master map, the plurality of applications may be able to perform modifications in the feature of the new component at their level. Further, the configuration code associated with the each of the plurality of applications may be modified, at step 406, using the code modification engine 212. To modify the configuration code, update in the each of the plurality of applications may be taken into consideration.

Figure 5:
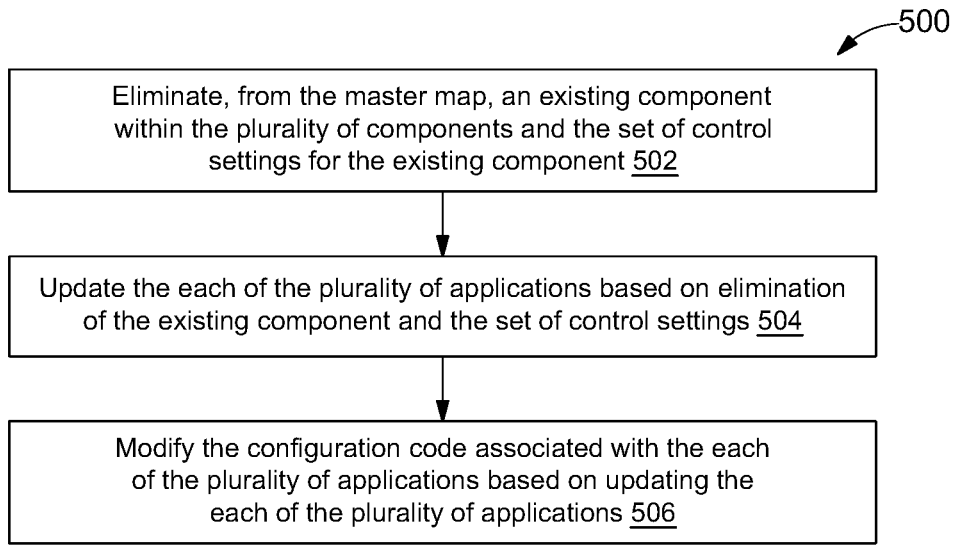
FIG. 5 illustrates a flow diagram of an exemplary process for eliminating components and control settings from a master map, in accordance with some embodiments of the present disclosure.

FIG. 5 is a flow diagram 500 that depicts an exemplary process for eliminating components and control settings from a master map, in accordance with an exemplary embodiment of the present disclosure. Each step of the process may be executed by the computing device 102. FIG. 5 is explained in conjunction with FIGS. 1-4.

At step 502, an existing component within the plurality of components and the set of control settings for the existing component may be eliminated from the master map. This step may be performed by the master map customization engine 208. In some embodiments, a subtractive input may be received. The subtractive input may be "eliminate the existing component and the corresponding control setting". Further, based on the subtractive input, the existing component and the corresponding set of control setting may be removed from the master map.

With reference to the FIG. 4, for example, the master map (with the components "Email or phone", "password", "forgot email?", "learn more", and "create account") receives the subtractive input to remove the existing component "create account" and the corresponding set of control setting including "set text" and "set visibility". At that time, the component "create account" and the set of control setting including "set text" and "set visibility" may be eliminated from the master map. Further, a customized master map after elimination of the existing component may include the components "Email or phone", "password", "forgot email?", and "learn more".

Further, at step 504, the each of the plurality of applications may be updated based on elimination of the existing component and the set of control settings. This step may be performed by the application updating engine 210. In other words, the elimination of the existing component "create account" may be reflected in the plurality of applications. Thereafter, at step 506, the configuration code associated with the each of the plurality of applications may be modified based on updating the each of the plurality of applications. The code modification engine 212 is responsible for performing this step.

Figure 6:
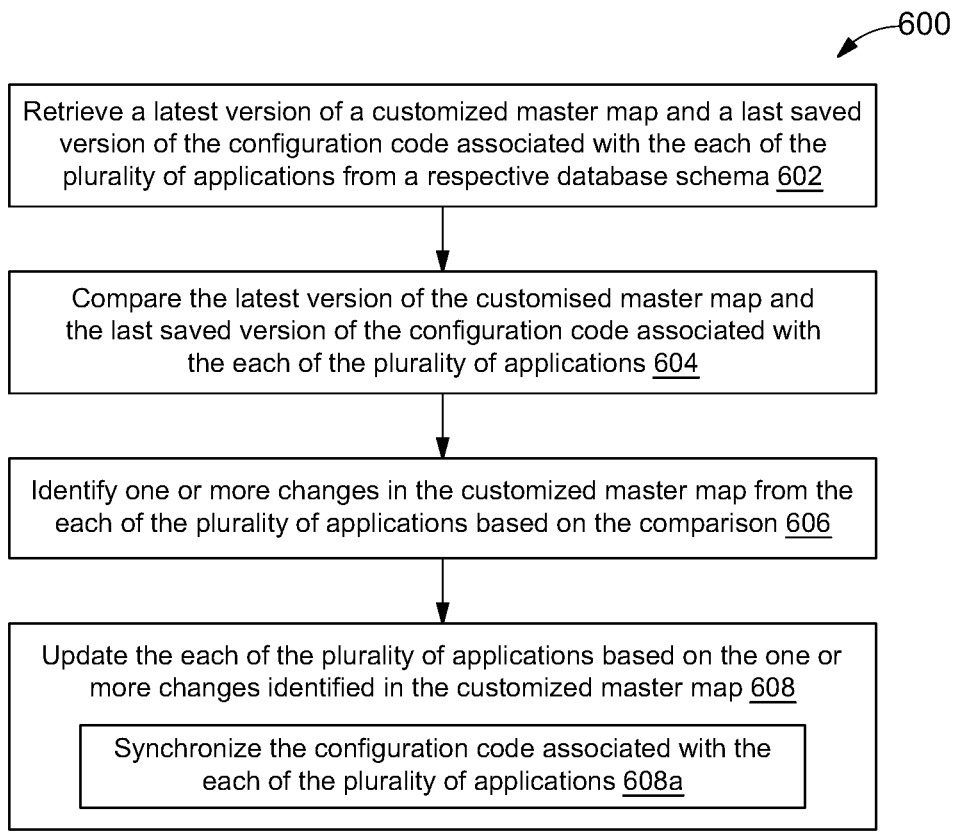
FIG. 6 illustrates a flow diagram of an exemplary process for updating plurality of applications, in accordance with some embodiments of the present disclosure.

FIG. 6 is a flow diagram 600 that depicts an exemplary process for updating plurality of applications, in accordance with an exemplary embodiment of the present disclosure. Each step of the process may be executed by the engines 208-212 of the computing device 102. FIG. 6 is explained in conjunction with FIGS. 1-5. At step 602, a latest version of a customized master map and a last saved version of the configuration code associated with the each of the plurality of applications may be retrieved from a respective database schema. The latest version of the customized master map may correspond to latest update in the master map, and the last saved version of the configuration code associated with the each of the plurality of applications may correspond to the previous version of the configuration code which may not be modified based on latest changes in the master map.

At step 604, the latest version of the customized master map may be compared with the last saved version of the configuration code associated with the each of the plurality of applications. Further, at step 606, based on the comparison, one or more changes in the customized master map from the each of the plurality of applications may be identified. It should be noted that the identification may be performed using a deterministic algorithm and a contextual algorithm. These algorithms are explained further in detail in conjunction with FIGS. 13A and 13B.

With reference to FIG. 4, for example, the latest version of the master map may include the components "Email or phone", "password", "forgot email?", "learn more", and "create account". However, the last saved version of the configuration code associated with the each of the plurality of applications may be with respect to the components "Email or phone", "password", "forgot email?", and "learn more". Thus, there is a change with respect to the component "create account".

At step 608, the each of the plurality of applications may be updated based on the one or more changes identified in the customized master map. For example, the plurality of applications may be updated based on the change with respect to the component "create account". In some embodiments, the configuration code associated with the each of the plurality of applications may be synchronized to update the each of the plurality of applications.

Figure 7:
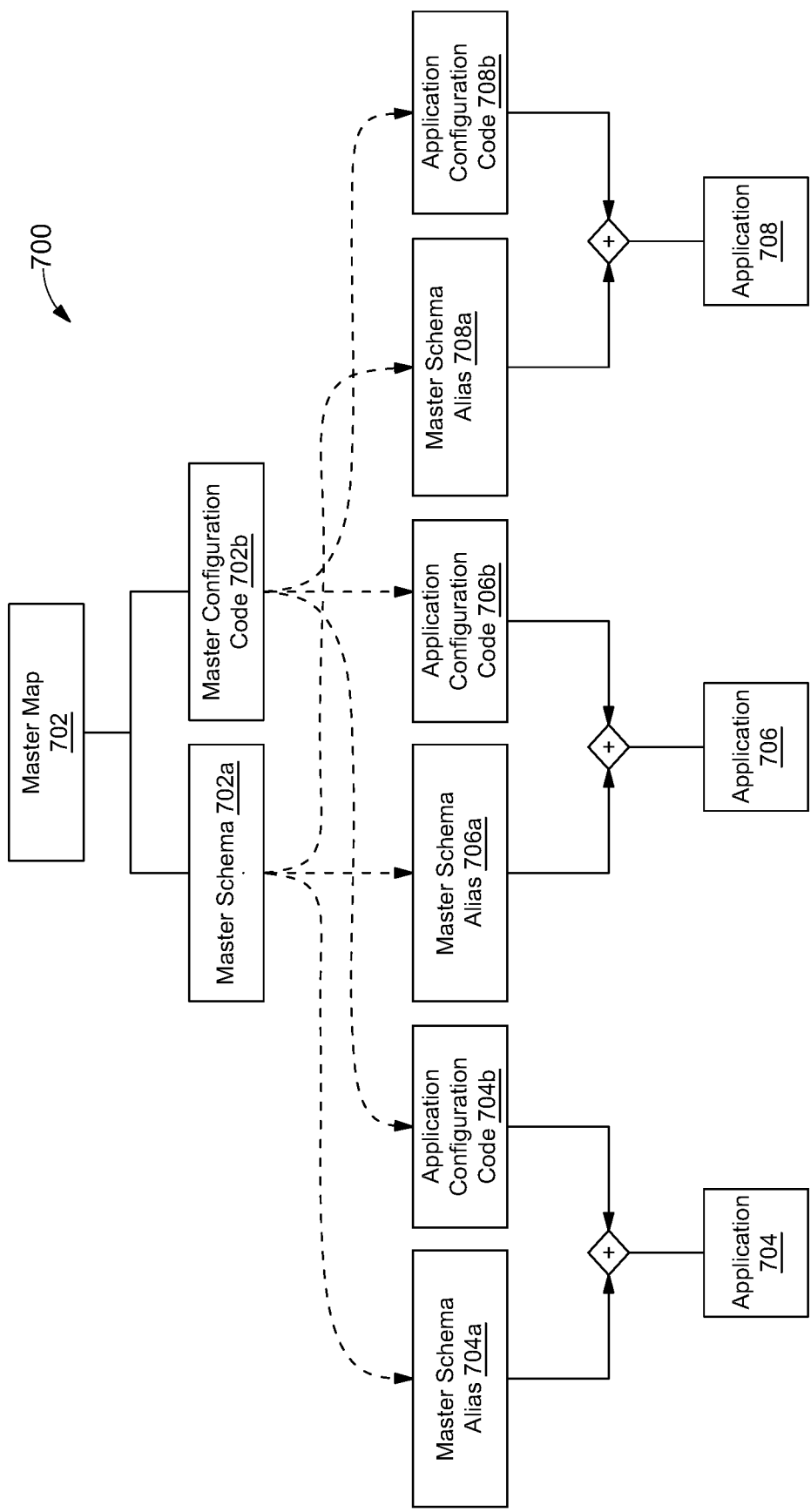
FIG. 7 illustrates an exemplary representation for updating of applications and associated configuration codes based on a master map, in accordance with some embodiments of the present disclosure.

FIG. 7 is an exemplary representation 700 that depicts updating of applications and associated configuration codes based on a master map, in accordance with an exemplary embodiment of the present disclosure. FIG. 7 is explained in conjunction with FIGS. 1-6.

The exemplary representation 700 includes a master map 702 (i.e., a blueprint or a sitemap) associated with applications (for example, an application 704, an application 706, and an application 708). The master map 702 may include a master schema 702*a* and a master configuration code 702*b*. Further, the application 704 may have a master schema Alias/application schema 704*a*, and an application configuration code 704*b*. The application 706 may have a master schema Alias/application schema 706*a*, and an application configuration code 704*b*. The application 708 may have a master schema Alias/application schema 708*a*, and an application configuration code 708*b*.

It should be noted that master schema Aliases 704*a*, 706*a*, and 708*a* (i.e., applications schemas) may be modified based on experiences in the master schema 702*a*. Further, the application configuration codes 704*b*, 706*b*, and 708*b* may be modified based on the master configuration code 702*b*. For example, if an input to customize the master map 702 is received, the master schema 702*a* and the master configuration code 702*b* may be modified based on the input. Further, the applications and associated configurations may be updated in such a way that the modifications may be reflected immediately in the master schema Aliases 704*a*, 706*a*, and 708*a* based on modifications in the master schema 702*a*, and the application configuration codes 704*b*, 706*b*, 708*b* may be updated based on modifications in the master configuration code 702*b*, when the applications 704, 706, 708 are reloaded.

Figure 8:
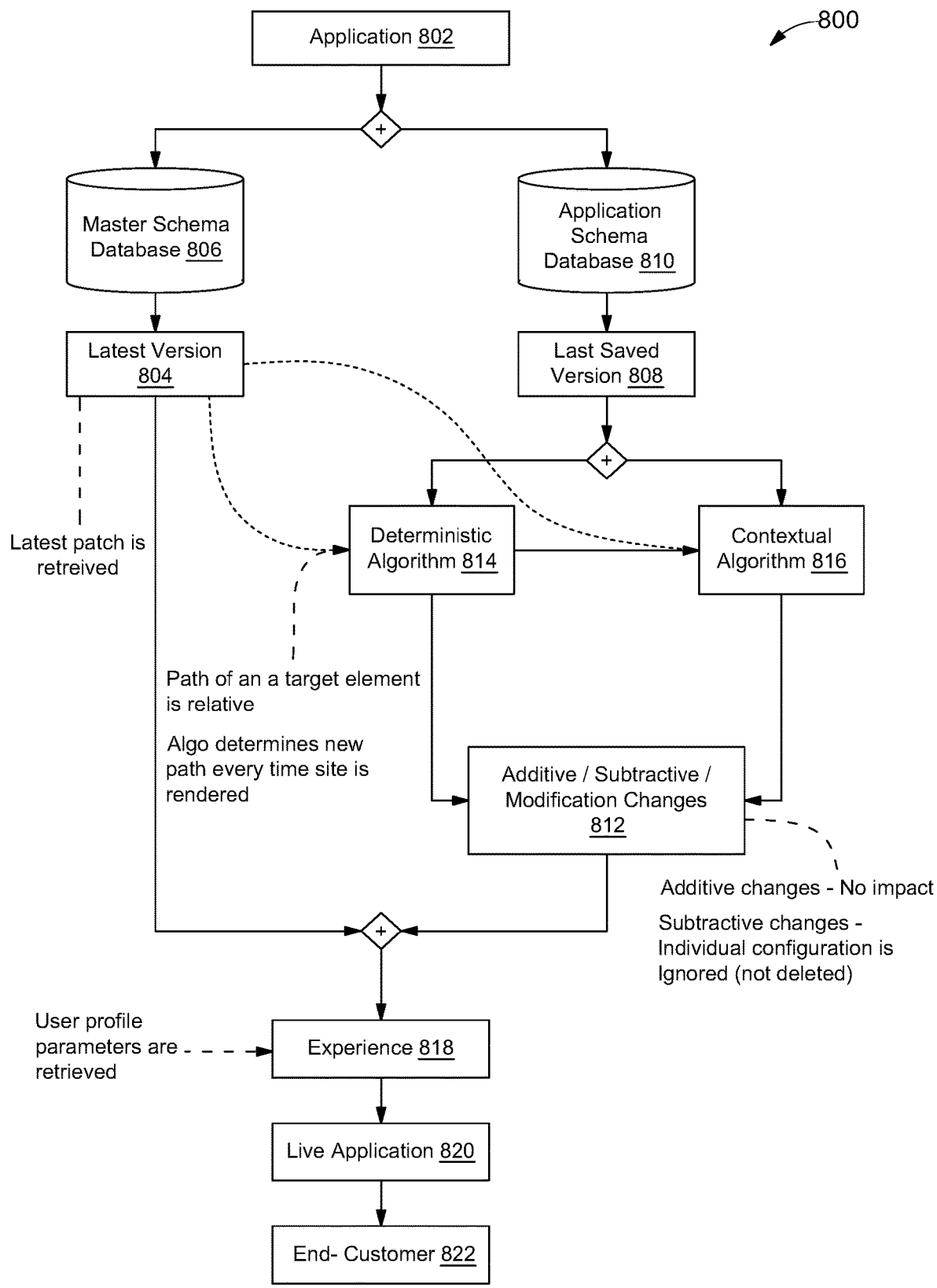
FIG. 8 illustrates an exemplary representation for synchronization of applications and a master map during runtime, in accordance with some embodiments of the present disclosure.

FIG. 8 is an exemplary representation 800 that depicts synchronization of applications and a master map during run-time, in accordance with an exemplary embodiment of the present disclosure. FIG. 8 is explained in conjunction with FIGS. 1-7. When a user navigates to an application 802, a latest version 804 of a customized master map may be retrieved from a master schema database 806 and a last saved version 808 of the configuration code associated the application 802 may be retrieved from an application schema database 810. The latest version 804 of a customized master map may correspond to an abstract model schema of a blueprint. The last saved version 808 of the configuration code may correspond to a compiled application configuration code.

Further, one or more changes (for example, a new path of a target component and additive/subtractive/modification changes 812) may be identified through a deterministic algorithm 814 and a contextual algorithm 816. When positions of two components are interchanged in the master map, the new path may be identified. Relative positions of the components may be determined to identify the new path. For example, the new path may be identified when position of a component "rating" is interchanged with position of the component "Add to cart." The new path may be identified through the deterministic algorithm 814 and additive/subtractive/modification changes 812 may be identified through the contextual algorithm 816.

To identify the one or more changes, the latest version 804 of the customized master map may be compared with the last saved version 808 of the configuration code associated with the application 802. Further, an experience 818 is generated at run-time based on the latest version 804 and the identified one or more changes. Also, a couple of factors like user profile parameters, hyper personalization data (a hyper personalization mechanism may be applied) may be considered to generate the experience 818. The user parameters may include loyalty, preferences, location, language of a user, and the like. Further, the experience 818 may be injected to a live application 820, and the experience 818 may be rendered to an end-customer 822.

Further, one or more changes (for example, a new path of a target component and additive/subtractive/modification changes 812) may be identified through a deterministic algorithm 814 and a contextual algorithm 816. When positions of two components are interchanged in the master map, the new path may be identified. Relative positions of the components may be determined to identify the new path. For example, the new path may be identified when position of a component "rating" is interchanged with position of the component "Add to cart". The new path may be identified through the deterministic algorithm 814 and additive/subtractive/modification changes 812 may be identified through the contextual algorithm 816.

Figure 9:
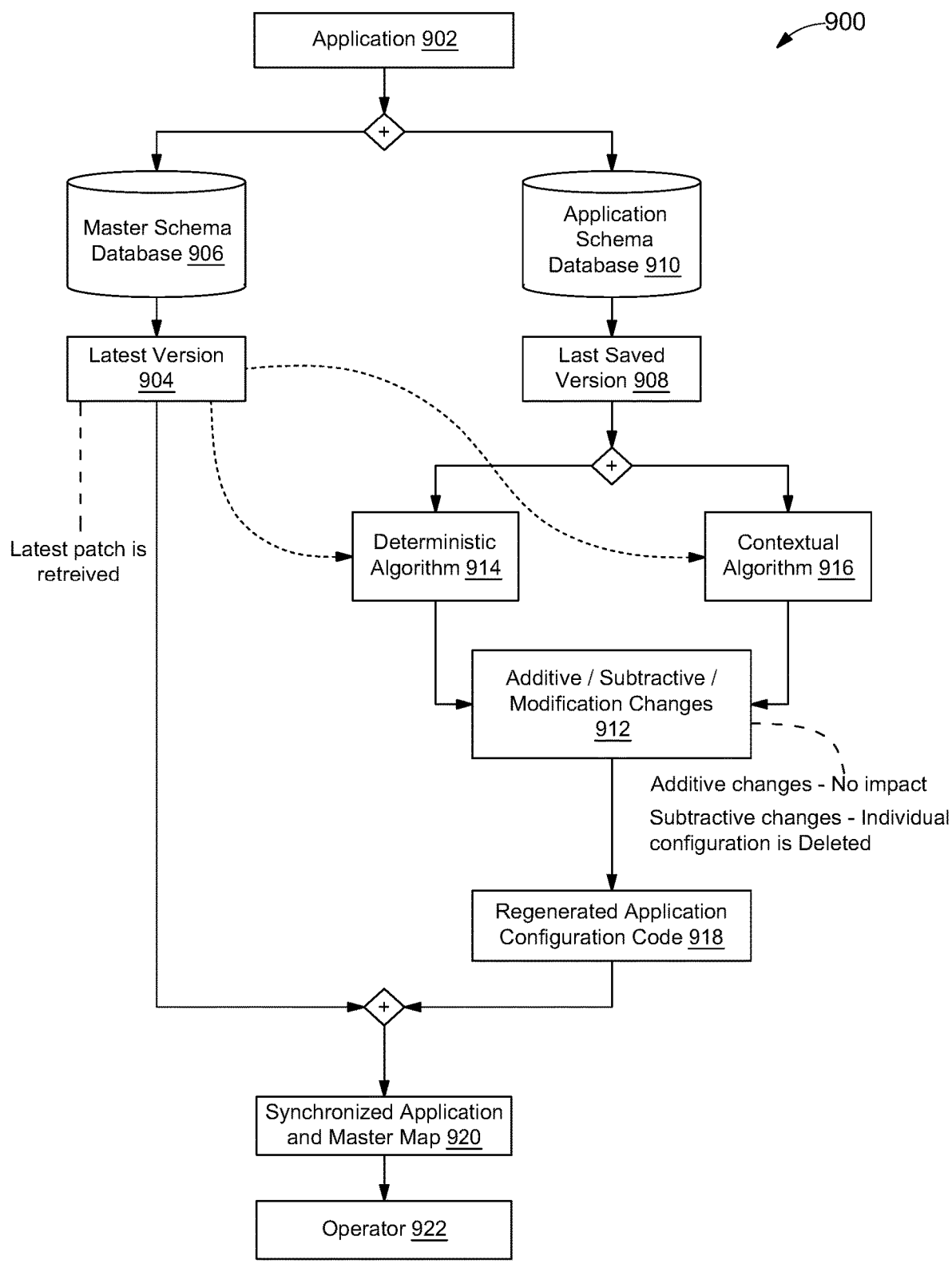
FIG. 9 illustrates an exemplary representation for re-synchronization of applications and a master map during design-time, in accordance with some embodiments of the present disclosure.

FIG. 9 is an exemplary representation 900 that depicts synchronization of applications and a master map during design-time, in accordance with an exemplary embodiment of the present disclosure. FIG. 9 is explained in conjunction with FIGS. 1-8. When an application 902 is loaded in a studio, a latest version 904 of a customized master map may be retrieved from a master schema database 906 and a last saved version 908 of the configuration code associated the application 902 may be retrieved from an application schema database 910. The latest version 904 of the customized master map may correspond to an abstract model schema of a blueprint. The last saved version 908 of the configuration code may correspond to a compiled application configuration code. It should be noted that the latest version 904 of the customized master map may always be fetched. Even in case of several interim patches, the latest version 904 may be retrieved when the application is not reloaded with respect to the interim patches (interim patches may be ignored).

Further, one or more changes (for example, a new path of a target component and additive/subtractive/modification changes 912) may be identified through a deterministic algorithm 914 and a contextual algorithm 916. The new path may be identified through the deterministic algorithm 914 and additive/subtractive/modification changes 912 may be identified through the contextual algorithm 916.

To identify the one or more changes, the latest version 904 of the customized master map may be compared with the last saved version 908 of the configuration code associated with the application 902. Based on the identified one or more changes, the configuration code of the application 902 may be modified to get a regenerated application configuration code 918. Thus, a synchronized application and master map 920 may be obtained, which may be rendered to an operator 922.

Figure 10:
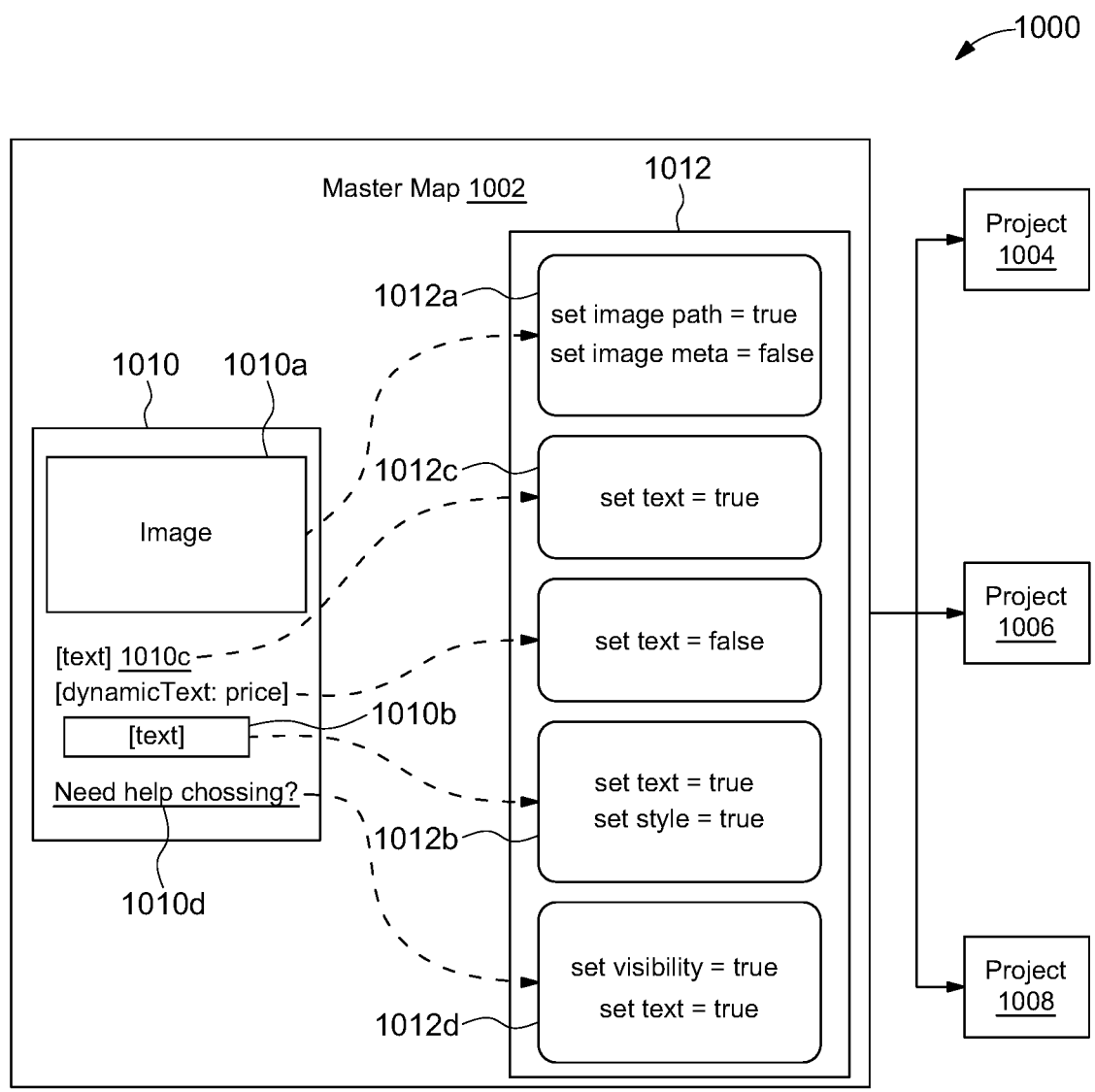
FIG. 10 illustrates an exemplary representation of a master map powering three projects, in accordance with some embodiments of the present disclosure.

FIG. 10 is an exemplary representation 1000 of a master map 1002 powering three projects (For example, a project 1004, a project 1006, and a project 1008), in accordance with an exemplary embodiment of the present disclosure. FIG. 10 is explained in conjunction with FIGS. 1-9. It should be noted that the projects 1004, 1006, and 1008 may correspond to applications. The applications may be web applications, websites, or mobile applications.

As illustrated in FIG. 10, the master map 1002 may include a plurality of components 1010 and sets of control settings 1012 for the plurality of components 1010. By way of an example, the master map 1002 includes a component image 1010*a* and a set of control settings 1012*a* including a control setting "set image path" and a control setting "set image meta" for the component image 1010*a*. A status of the control setting "set image path" is "true" (i.e., a true status), and the status of the control setting "set image meta" is "false". Since the status of the control setting "set image path" is "true" with respect to the image 1010*a*, a user or an operator may be capable of performing modifications in a location of the component image 1010*a* at project level. The status of the control setting "set image meta" is "false" with respect to the component image 1010*a*, thus the user may not be able to perform modifications in metadata of the component image 1010*a* at project level.

By way of another example, the master map 1002 includes a component [text] 1010*b* (i.e., another component of the master map 1002) and a set of control settings 1012*b* including a control setting "set text" and a control setting "set style" for the component [text] 1010*b*. The status of the control setting "set text" is "true" (i.e., the true status), and the status of the control setting "set style" is also "true". Since the status of the control setting "set text" and the control setting "set style" are "true" with respect to the component [text] 1010*b*, the user or the operator may be capable of performing modifications in text and style of the component [text] 1010*b* in each of the master map powered projects 1004, 1006, and 1008.

The project 1004 may include project level rendering of components 1014 and project level configuration settings 1016 available to the operator. Similarly, the project 1006 may include project level rendering of components 1018 and project level configuration settings 1020, and the project 1008 may include project level rendering of components 1022 and project level configuration settings 1024. The operator may perform modifications in features of the one or more of the components 1010 in one or more of the projects 1004, 1006, 1008 while rendering the components 1010 at project levels using one or more of the project level configuration settings 1016, 1020, 1024, based on their status in the master map 1002.

For example, for a component [text] 1010*c*, the set of control settings include a control setting "set text" 1012*c*. Thus, as illustrated in the projects 1004, 1006 and 1008, the operator has changed text of the component [text] 1010*c* to "AAA" in the project 1004, "BBB" in the project 1006, "CCC" in the project 1008. The operator may have performed the changes using the configuration settings 1016*a*, 1020*a*, 1024*a*.

Further, for more clarity, a component "Need help choosing?" 1010*d* and an associated set of control setting (including "set visibility" and "set text") is illustrated in the master map 1002. The control settings "set visibility" and "set text" are activated in the master map 1002. In other words, the status for each of the control settings "set visibility" and "set text" for the component "Need help choosing?" 1010*d* is "true". Therefore, the user may be able to change the text of component "Need help choosing?" 1010*d* as well as its visibility of the "Need help choosing?" 1010*d* at project level rendering of the components 1014, 1018, 1022. For example, in the project 1004, the text of the component "Need help choosing?" 1010*d* is not changed, and visible as "Need help choosing?" at project level rendering of the components 1014. This may be performed by the user using a project level configuration setting 1016*b*, as the text in the project level configuration setting 1016*b* is still "need help choosing?" and visibility of the text is "on".

Further, in a configuration setting 1020*b* of the project 1006, the visibility is "off". Thus, the component "Need help choosing?" 1010*d* is not visible at project level rendering of the components 1018. Moreover, in a configuration setting 1024*b* of the project 1008, text of the component "Need help choosing?" 1010*d* is changed to "Serve aluto?" and visibility is "on". Thus, at the project-level rendering of the components 1022, the text is visible and reflected as "Serve aluto?".

Figure 11:
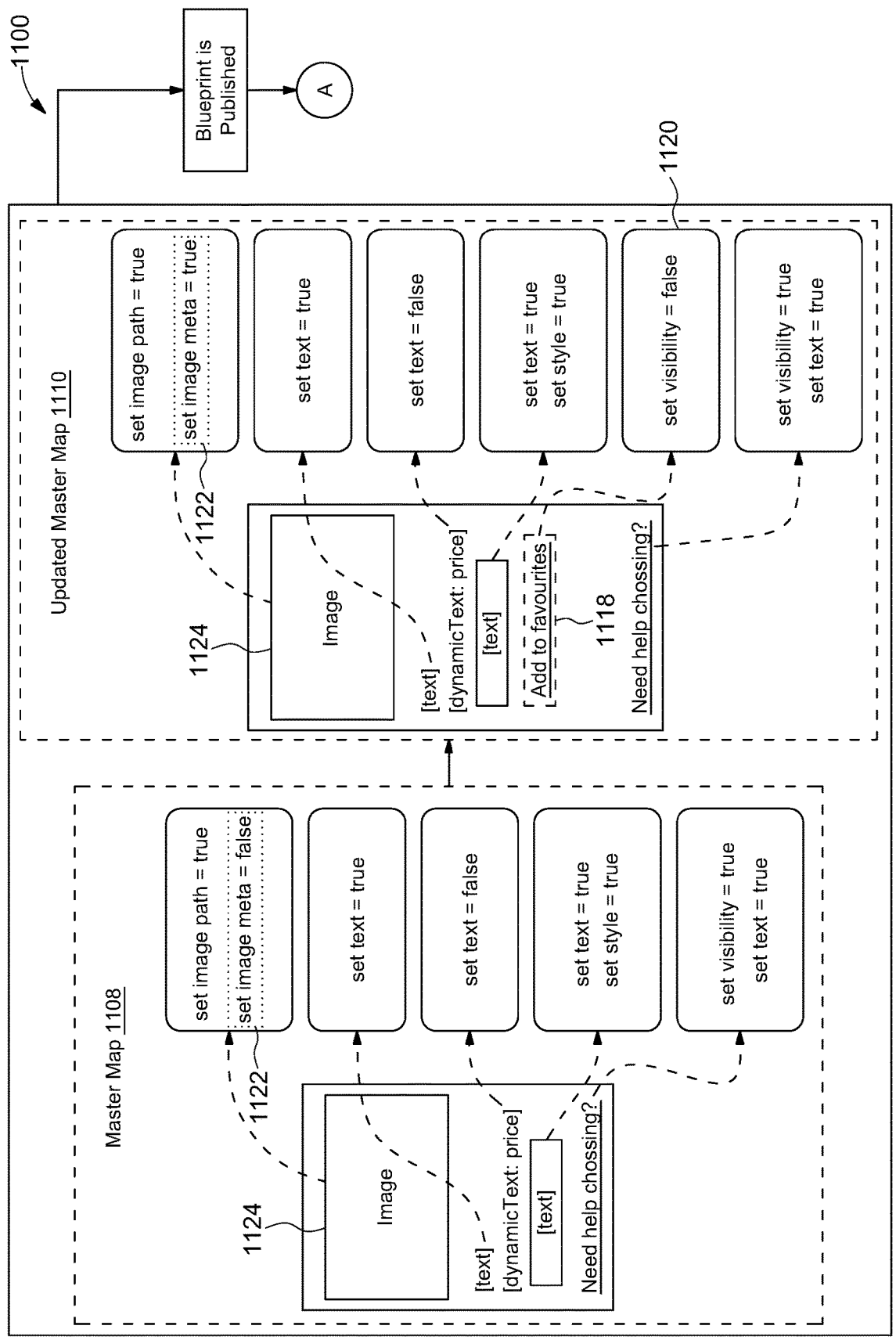
FIG. 11 illustrates exemplary representation for updating projects based on customization of a master map, in accordance with some embodiments of the present disclosure.

FIG. 11 is an exemplary representation 1100 for updating projects (for example, a project 1102, a project 1104, and a project 1106) based on customization of a master map 1108, in accordance with an exemplary embodiment of the present disclosure. FIG. 11 is explained in conjunction with FIGS. 1-10. The projects 1102, 1104, 1106 may be similar to the projects 1004, 1006, 1008, respectively. It should be noted that the projects 1102, 1104, 1106 may correspond to applications. The applications may be web applications, websites, or mobile applications. Further, updates in the master map 1108, and the projects 1102, 1104, 1106 are represented by an updated master map 1110, and in updated projects 1112, 1114, 1116.

By way of an example, consider a scenario where one or more additive inputs or modification inputs are received to customize the master map 1108. Further, based on the one or more additive inputs or modification inputs, the master map 1108 may be customized and as a result the updated master map 1110 may be generated. For example, the additive input may include "add a new component "Add to favorites" 1118 and a new control setting "set visibility" 1120" to the master map 1108. The modification input may include "change a status of a control setting "set image meta" 1122 for a component "image" 1124 from "false" to "true". As illustrated in the updated master map 1110, addition of the new component "Add to favorites" 1118 and the new control setting "set visibility" 1120 is reflected, and the status of the control setting "set meta" 1122 is changed to "true".

Now, when the updated master map is published, all the additions and modifications as represented in the updated master map 1110 may be reflected in the updated projects 1112, 1114, 1116. In other words, the projects 1102, 1104, 1106 may be updated based on the updated master map 1110. As the status of the control setting "set image meta" 1122 is now "true" in the updated master map 1110, a user may be able to change metadata of the component "image" 1124 at project level. For example, the metadata of the component "image" 1224 is changed to "image A" 1126 through a corresponding project level configuration setting in the project 1102. Thus, the updated project 1112 includes the text as "image A" 1126 instead of "image". Similarly, metadata of the component "image" 1124 is changed to "image B" 1128 in the project 1104, and "image C" 1130 in the project 1106, through corresponding project level configuration settings.

The addition of the new component "Add to favorites" 1118 and the new control setting "set visibility" 1120 is also reflected in the projects 1102, 1104, and 1106. However, the user may not be able to change visibility of the new component "Add to favorites" 1118 at project levels as the status of the new control setting "set visibility" 1120 is "false". Thus, all the updated projects 1112, 1114, 1116. include text "Add to favorites".

Figure 12:
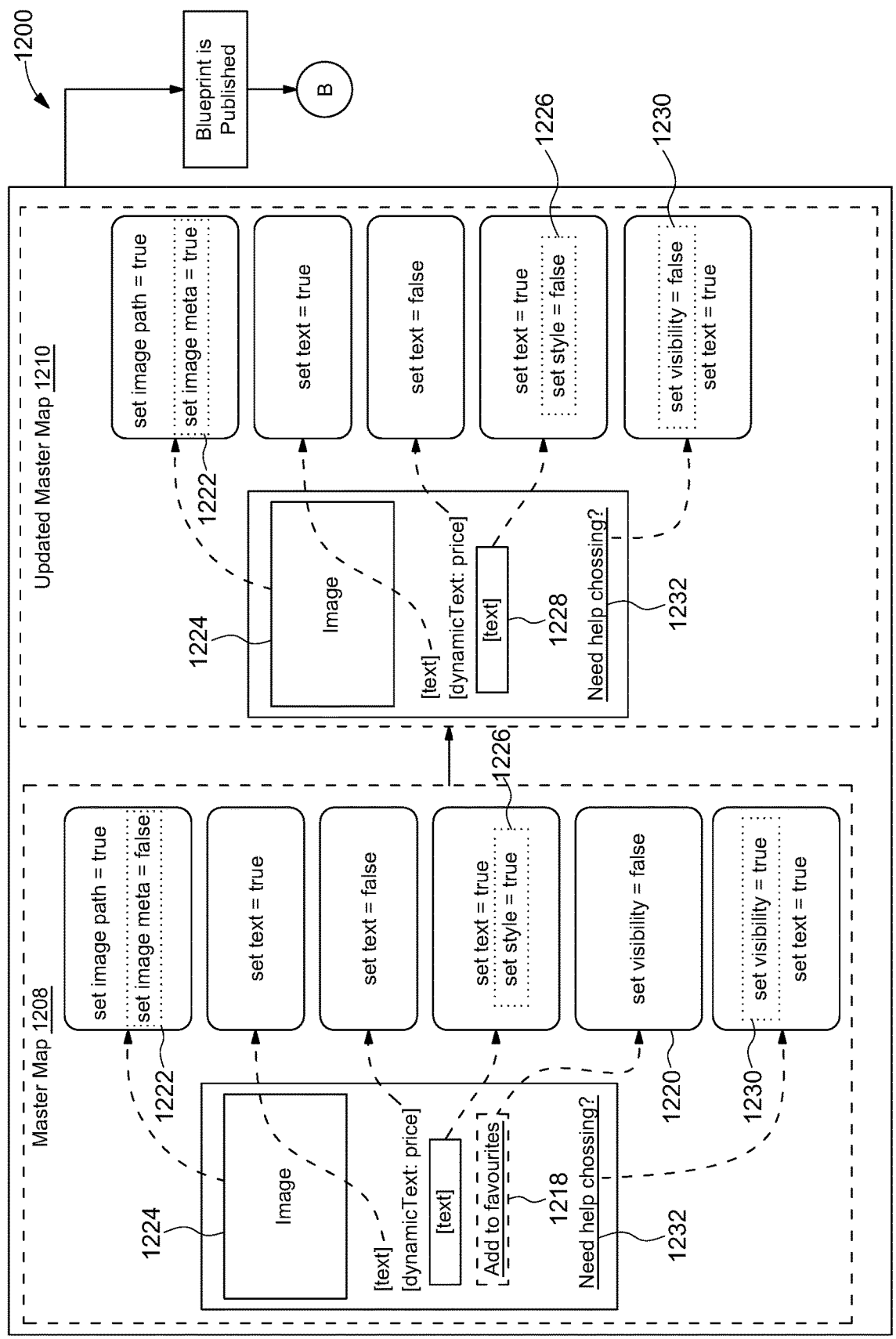
FIG. 12 illustrates another exemplary representation for updating projects based on customization of a master map, in accordance with some embodiments of the present disclosure.

FIG. 12 is an exemplary representation 1200 for updating projects (for example, a project 1202, a project 1204, and a project 1206) based on customization of a master map 1208, in accordance with an exemplary embodiment of the present disclosure. FIG. 12 is explained in conjunction with FIGS. 1-11. It should be noted that the projects 1202, 1204, and 1206 may correspond to applications. The applications may be web applications, websites, or mobile applications. It should be noted that updates in the master map 1208, and the projects 1202, 1204, 1206 are represented by an updated master map 1210, and in updated projects 1212, 1214, 1216.

By way of an example, consider a scenario where one or more subtractive inputs or modification inputs are received to customize the master map 1208. Further, based on the one or more subtractive inputs or modification inputs, the master map 1208 may be customized and as a result the updated master map 1210 may be generated. For example, the subtractive input may include "eliminate an existing component "Add to favorites" 1218 and a corresponding control setting "set visibility" 1220" from the master map 1208. The modification input may include "change a status of a control setting "set image meta" 1222 for a component "image" 1224 from "false" to "true", "change the status of a control setting "set style" 1226 for a component [text] 1228 from "true" to "false", and "change the status of a control setting "set visibility" 1230 for a component "Need help choosing?" 1232 from "true" to "false".

As illustrated in the updated master map 1210, elimination of the existing component "Add to favorites" 1218 and the control setting "set visibility" 1220 is reflected, and the status of the control setting "set image meta" 1222 is changed to "true", the status of the control setting "set style" 1226 and the control setting "set visibility" 1230 are changed to "false".

Now, when the updated master map is published, all the eliminations and modifications as represented in the updated master map 1210 may be reflected in the updated projects 1212, 1214, 1216. In other words, the projects 1202, 1204, 1206 may be updated based on the updated master map 1210. As the status of the control setting "set image meta" 1222 is now "true" in the updated master map 1210, a user may be able to change metadata of the component "image" 1224 at project level. For example, the metadata of the component "image" 1224 is changed to "image A" 1234 through a corresponding project level configuration setting in the project 1202. Thus, the updated project 1212 includes the text as "image A" 1234 instead of text "image". Similarly, the metadata of the component "image" 1224 is changed to "image B" 1236 in the project 1204, and "image C" 1238 in the project 1206, through corresponding project level configuration settings.

Further, the status of the control setting "set style" 1226 and the control setting "set visibility" 1230 is "false". The user may not be able to change style of the component [text] 1228 and visibility of the component "Need help choosing?" 1232 through respective project-level configuration settings. Moreover, the component "Add to favorites" 1218 and the corresponding control setting "set visibility" 1220 are removed from the projects 1202, 1204, 1206. Hence, all the updated projects 1212, 1214, 1216 may not have the component the component "Add to favorites" 1218 and the corresponding control setting "set visibility" 1220.

Figure 13A:
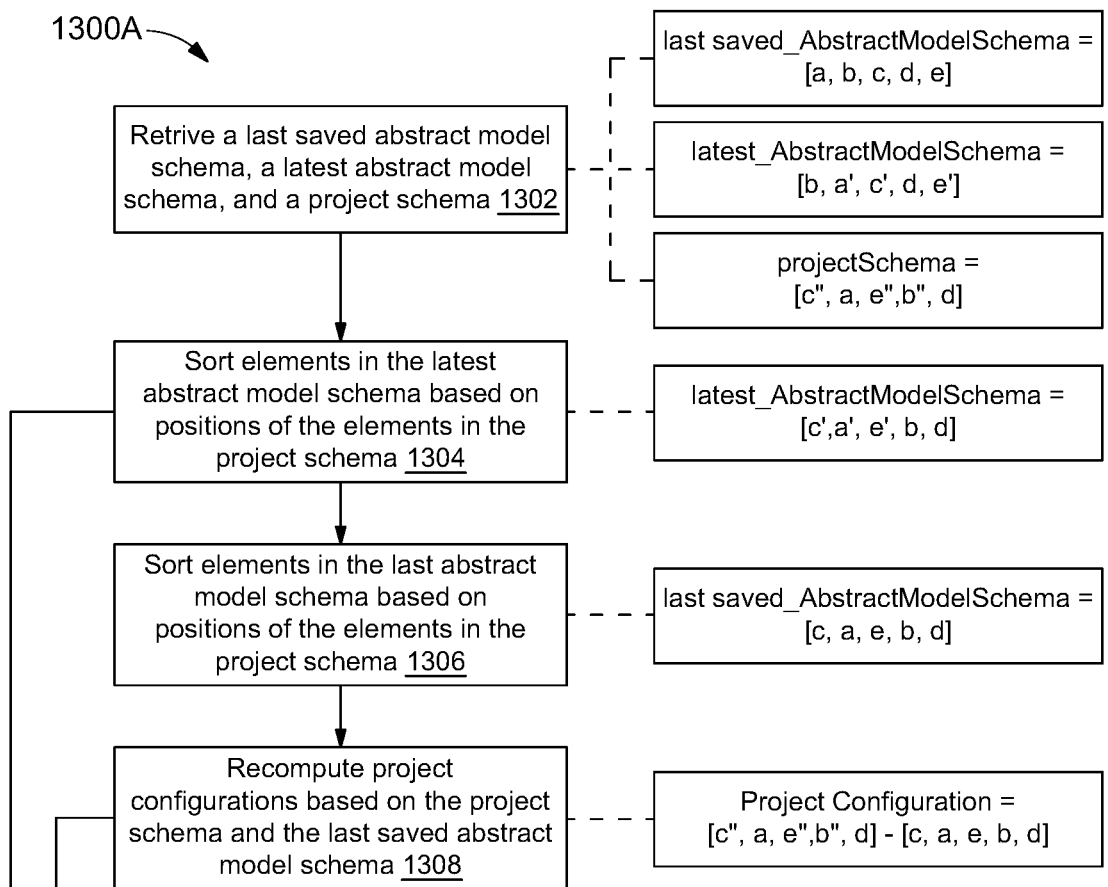
FIG. 13A illustrates a flow diagram of a deterministic algorithm, in accordance with some embodiments of the present disclosure.

FIG. 13A is a flow diagram 1300A that depicts a deterministic algorithm, in accordance with an exemplary embodiment of the present disclosure. The deterministic algorithm may be used to define path of components. FIG. 13A is explained in conjunction with FIGS. 1-12. At step 1302, a last saved abstract model schema (i.e., a last saved schema of a master map), a latest abstract model schema (i.e., a latest schema of the master map), and a project schema (i.e., a last saved schema of a project) may be retrieved. The schemas may be considered as an array of elements. Each element may correspond to a component or an object. The array of elements for the last saved abstract model schema is [a, b, c, d, e]. Further, the array of elements for the latest saved abstract model schema is [b, a', c', d, e'], and for the project schema is [c", a, e", b", d].

At step 1304, elements in the latest abstract model schema may be sorted based on positions of the elements in the project schema. For example, the array of elements for the latest abstract model schema after sorting may be modified to [c', a', e', b, d]. from [b, a', c', d, e']. Thereafter, at step 1306, elements in the last saved abstract model schema may be sorted based on positions of the elements in the project schema. For example, the array of elements for the last saved abstract model schema after sorting may be modified to [c, a, e, b, d]. from [a, b, c, d, e].

At step 1308, project configurations may be recomputed by comparing the array of elements [c", a, e", b", d] of the project schema and the array with sorted elements [c, a, e, b, d] of the last saved abstract model schema (i.e., project configuration=[c", a, e", b", d]–[c, a, e, b, d]).

Figure 13B:
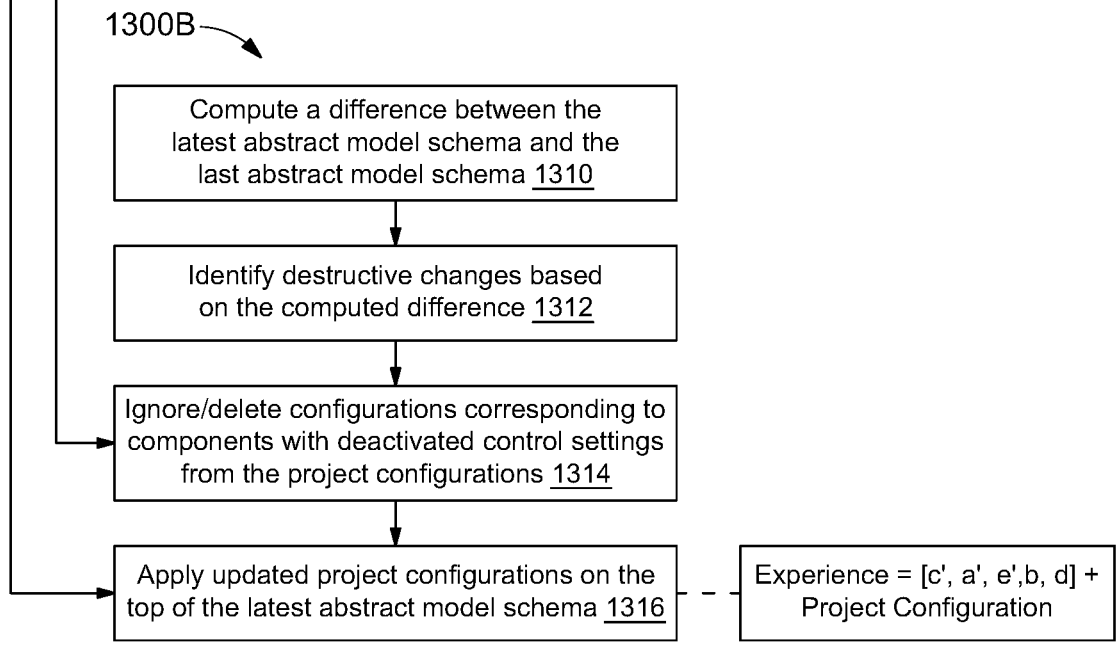
FIG. 13B illustrates a flow diagram of a contextual algorithm, in accordance with some embodiments of the present disclosure.

FIG. 13B is a flow diagram 1300B that depicts a contextual algorithm, in accordance with an exemplary embodiment of the present disclosure. FIG. 13A is explained in conjunction with FIGS. 1-12 and 13A. At step 1310, a difference between the latest abstract model schema and the last abstract model schema may be determined. At step 1312, destructive changes may be identified based on the computed difference. For example, components with deactivated control settings may be identified.

Further, at step 1314, based on the destructive changes, configurations corresponding to the components with deactivated control settings may be ignored (during run time) or deleted (during design time) from the project configurations computed through the deterministic algorithm. Thus, updated project configurations may be determined. Thereafter, at step 1316, the updated project configurations may be applied on the top of the latest abstract model schema having the array of elements to [c', a', e', b, d] for generating experience.

Figure 14:
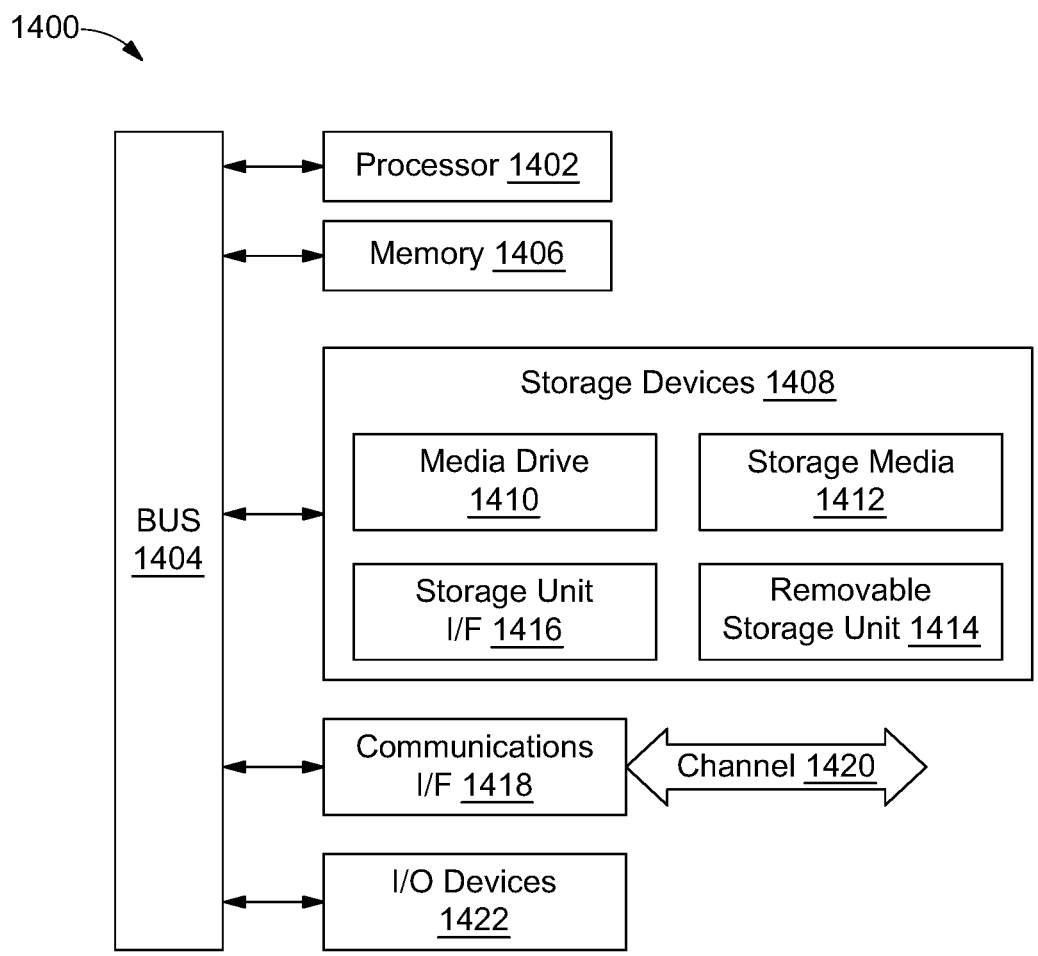
FIG. 14 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 14, an exemplary computing system 1400 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1400 may represent, for example, a user device such as a desktop, a laptop, a mobile phone, personal entertainment device, DVR, and so on, or any other type of special or general-purpose computing device as may be desirable or appropriate for a given application or environment. The computing system 1400 may include one or more processors, such as a processor 1402 that may be implemented using a general or special purpose processing engine such as, for example, a microprocessor, microcontroller or other control logic. In this example, the processor 1402 is connected to a bus 1404 or other communication medium. In some embodiments, the processor 1402 may be an AI processor, which may be implemented as a Tensor Processing Unit (TPU), or a graphical processor unit, or a custom programmable solution Field-Programmable Gate Array (FPGA).

The computing system 1400 may also include a memory 1406 (main memory), for example, Random Access Memory (RAM) or other dynamic memory, for storing information and instructions to be executed by the processor 1402. The memory 1406 also may be used for storing temporary variables or other intermediate information during execution of instructions to be executed by the processor 1402. The computing system 1400 may likewise include a read only memory ("ROM") or other static storage device coupled to bus 1404 for storing static information and instructions for the processor 1402.

The computing system 1400 may also include a storage device 1408, which may include, for example, a media drives 1410 and a removable storage interface. The media drive 1410 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 1412 may include, for example, a hard disk, magnetic tape, flash drive, or other fixed or removable medium that is read by and written to by the media drive 1410. As these examples illustrate, the storage media 1412 may include a computer-readable storage medium having stored there in particular computer software or data.

In alternative embodiments, the storage devices 1408 may include other similar instrumentalities for allowing computer programs or other instructions or data to be loaded into the computing system 1400. Such instrumentalities may include, for example, a removable storage unit 1414 and a storage unit interface 1416, such as a program cartridge and cartridge interface, a removable memory (for example, a flash memory or other removable memory module) and memory slot, and other removable storage units and interfaces that allow software and data to be transferred from the removable storage unit 1414 to the computing system 1400.

The computing system 1400 may also include a communications interface 1418. The communications interface 1418 may be used to allow software and data to be transferred between the computing system 1400 and external devices. Examples of the communications interface 1418 may include a network interface (such as an Ethernet or other NIC card), a communications port (such as for example, a USB port, a micro USB port), Near field Communication (NFC), etc. Software and data transferred via the communications interface 1418 are in the form of signals which may be electronic, electromagnetic, optical, or other signals capable of being received by the communications interface 1418. These signals are provided to the communications interface 1418 via a channel 1420. The channel 1420 may carry signals and may be implemented using a wireless medium, wire or cable, fiber optics, or other communications medium. Some examples of the channel 1420 may include a phone line, a cellular phone link, an RF link, a Bluetooth link, a network interface, a local or wide area network, and other communications channels.

The computing system 1400 may further include Input/Output (I/O) devices 22. Examples may include, but are not limited to a display, keypad, microphone, audio speakers, vibrating motor, LED lights, etc. The I/O devices 1422 may receive input from a user and also display an output of the computation performed by the processor 1402. In this document, the terms "computer program product" and "computer-readable medium" may be used generally to refer to media such as, for example, the memory 1406, the storage devices 1408, the removable storage unit 1414, or signal(s) on the channel 1420. These and other forms of computer-readable media may be involved in providing one or more sequences of one or more instructions to the processor 1402 for execution. Such instructions, generally referred to as "computer program code" (which may be grouped in the form of computer programs or other groupings), when executed, enable the computing system 1400 to perform features or functions of embodiments of the present invention.

In an embodiment where the elements are implemented using software, the software may be stored in a computer-readable medium and loaded into the computing system 1400 using, for example, the removable storage unit 1414, the media drive 1410 or the communications interface 1418. The control logic (in this example, software instructions or computer program code), when executed by the processor 1402, causes the processor 1402 to perform the functions of the invention as described herein.

Thus, the present disclosure may overcome drawbacks of traditional systems as discussed before. The present disclosure overcomes the limitation of synchronization and scalability. The present disclosure discloses a computing device that updates applications in real-time and subsequently associated configuration codes every time a change occurs in an associated master map. A single master map can be generated to power multiple applications at a time. Further, modifications in the master map may be reflected in the live applications first in real time, upon publishing of the master map by synchronization between the master map and the live websites. Moreover, when an application is opened, configuration codes of the applications may be updated by resynchronization of the applications and the master map. Thus, there is no need to update configuration codes of the applications individually. As a result, infrastructure footprints may be decreased. The present disclosure helps in propagating all the modifications of the master map to the applications in run-time at once. Additionally, the disclosure supports any type of changes including additive changes as well as subtractive changes related to components and control settings, and modifications in components or control settings. The disclosure also provides enablement/disablement of application level controls through the master map.

For example, an enterprise has multiple websites for multiple countries, and a master map may be created for all the websites. As the websites belong to the same enterprise, there may be minor differences (one or two percent) among the websites. Further, a templet can be used to create the master map for the websites. Any change in the master map may be reflected in all the live websites and then in the configuration codes of the websites are opened. Also, controls of components can be provided to all the websites by enabling control settings of the components in the in the master map.

The present disclosure may be applicable in various fields including retail, commerce, telecom, media, insurance, automotive, financial services, travel, transportation, logistics, real estate, public & social sector, sports, energy, mining, industries, healthcare, education, and consumer packaged goods.

One master map of a consumer website may have associated multiple instances, one for each locale. One master map of a consumer website may have associated multiple Instances, one for each affiliate One master map of a consumer website may have associated multiple instances, one for each channel (Business to Business (B2B), Business to Consumer (B2C), Business to Business to Consumer (B2B2C)). One master map of a consumer website may have an associated single instance. One master map of a consumer website may have associated multiple instances, one for each business channel (i.e., a client 1, a client 2, and a client 3).

One master map of an enterprise website (internal/public) may have associated multiple instances, one for each locale.

One master map of an enterprise website (internal/public) may have associated multiple instances, one for each affiliate. One master map of an enterprise website (internal/public) may have associated multiple instances, one for each channel (B2B, B2C, and B2B2C). One master map of an enterprise website (internal/public) may have an associated single instance. One master map of an enterprise website (internal/public) may have associated multiple instances, one for each business channel (i.e., client 1, client 2, and client 3). One master map of an enterprise website (internal/public) may have associated multiple instances, one for each educational channel (i.e., school 1, school 2, school 3). One master map of an enterprise website (internal/public) may have associated multiple instances, one for each governmental channel (i.e., state 1, state 2, state 3 or any political subdivision of territory)

One master map of a consumer web application may have associated multiple instances, one for each locale. One master map of a consumer web application may have associated multiple instances, one for each affiliate. One master map of a consumer web application may have associated multiple instances, one for each channel (B2B, B2c, and B2B2C). One master map of a consumer web application may have an associated single instance. One master map of a consumer web application may have associated multiple instances, one for each business channel (i.e., client 1, client 2, and client 3).

One master map of an enterprise web application (internal/public) may have associated multiple instances, one for each locale. One master map of an enterprise web application (internal/public) may have associated multiple instances, one for each affiliate. One master map of an enterprise web application (internal/public) may have associated multiple instances, one for each channel (B2B, B2C, B2b2C). One master map of an enterprise web application (internal/public) may have an associated single instance. One master map of an enterprise web application (internal/public) may have associated multiple instances, one for each business channel (i.e., client 1, client 2, client 3). One master map of an enterprise web application (internal/public) may have associated multiple instances, one for each educational channel (i.e., school 1, school 2, school 3). One master map of an enterprise web application (internal/public) may have associated multiple instances, one for each governmental channel (i.e., state 1, state 2, state 3 or any political subdivision of territory).

One master map of an instore/outdoor display may have associated multiple instances, one for each location. One master map of an instore/outdoor display may have associated multiple instances, one for each location/locale. One master map of an instore/outdoor display may have associated multiple instances, one for each channel (B2B, B2C, B2B2C). One master map of an instore/outdoor display may have an associated single instance. One master map of an instore/outdoor display may have associated multiple instances, one for each business channel (i.e., client 1, client 2, client 3).

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of managing a plurality of applications, the method comprising:
   receiving, by a computing device, a first input for customization of a master map associated with the plurality of applications, wherein the master map comprises a plurality of components and a set of control settings for each of the plurality of components;
   modifying, by the computing device, in the master map, a status of a first control setting for a first component based on the first input;
   updating, by the computing device, each of the plurality of applications based on the modified status of the first control setting in the master map; and
   modifying, by the computing device, a configuration code associated with the each of the plurality of applications, based the update in each of the plurality of applications.

2. The method of claim 1, further comprising:
   adding, by the computing device, in the master map, a new component to the plurality of components and a new set of control settings for the new component;
   updating, by the computing device, the each of the plurality of applications based on addition of the new component and the new set of control settings; and
   modifying, by the computing device, the configuration code associated with the each of the plurality of applications based on updating the each of the plurality of applications.

3. The method of claim 1, further comprising:
   eliminating, by the computing device, from the master map, an existing component within the plurality of components and the set of control settings for the existing component;
   updating, by the computing device, the each of the plurality of applications based on elimination of the existing component and the set of control settings; and
   modifying, by the computing device, the configuration code associated with the each of the plurality of applications based on updating the each of the plurality of applications.

4. The method of claim 1, wherein modifying the status of the first control setting further comprises:
   for the first component and based on the first input, activating, by the computing device, the status of the first control setting; or deactivating, by the computing device, the status of the first control setting.

5. The method of claim 4, wherein activating the status of the first control setting further comprises providing, by the computing device, an authorization to the each of the plurality of applications to access the first component via the configuration code associated with the each of the plurality of applications.

6. The method of claim 5, wherein providing the authorization further comprises:

modifying a feature associated with the first component via the configuration code of an application of the plurality of applications based on a user requirement; and updating the application based on the configuration code.

7. The method of claim 6, further comprising reverting, by the computing device, the modification in the feature associated with the first component from the application when the status of the first control setting is deactivated in the master map.

8. The method of claim 4, wherein deactivating the status of the first control setting further comprises restricting, by the computing device, the authorization to the each of the plurality of applications to access the first component.

9. The method of claim 1, wherein updating the each of the plurality of applications further comprises:

retrieving, by the computing device, a latest version of a customized master map and a last saved version of the configuration code associated with the each of the plurality of applications from a respective database schema;

comparing, by the computing device, the latest version of the customized master map and the last saved version of the configuration code associated with the each of the plurality of applications;

identifying, by the computing device, one or more changes in the customized master map from the each of the plurality of applications based on the comparison, wherein the one or more changes is identified based on a deterministic algorithm and a contextual algorithm; and updating, by the computing device, the each of the plurality of applications based on the one or more changes identified in the customized master map, wherein updating the each of the plurality of applications comprises synchronizing the configuration code associated with the each of the plurality of applications.

10. A system for exchanging data between data processing systems, the system comprising a computing device, wherein the computing device comprises:

a processing circuitry; and a memory communicatively coupled to the processing circuitry, wherein the memory stores processor-executable instructions, which, on execution, causes the processing circuitry to:

receive a first input for customization of a master map associated with the plurality of applications, wherein the master map comprises a plurality of components and a set of control settings for each of the plurality of components;

modify, in the master map, a status of a first control setting for a first component based on the first input;

update each of the plurality of applications based on the modified status of the first control setting in the master map; and modify a configuration code associated with the each of the plurality of applications, based the update in each of the plurality of applications.

11. The system of claim 10, wherein the processor-executable instructions further cause the processing circuitry to:

add, in the master map, a new component to the plurality of components and a new set of control settings for the new component;

update the each of the plurality of applications based on addition of the new component and the new set of control settings; and modify the configuration code associated with the each of the plurality of applications based on updating the each of the plurality of applications.

12. The system of claim 10, wherein the processor-executable instructions further cause the processing circuitry to:

eliminate, from the master map, an existing component within the plurality of components and the set of control settings for the existing component;

update, the each of the plurality of applications based on elimination of the existing component and the set of control settings; and modify, the configuration code associated with the each of the plurality of applications based on updating the each of the plurality of applications.

13. The system of claim 10, wherein the processor-executable instructions further cause the processing circuitry to modify the status of the first control setting, for the first component and based on the first input, by:

activating, by the computing device, the status of the first control setting; or deactivating, by the computing device, the status of the first control setting.

14. The system of claim 13, wherein the processor-executable instructions further cause the processing circuitry to activate the status of the first control setting by providing an authorization to the each of the plurality of applications to access the first component via the configuration code associated with the each of the plurality of applications.

15. The system of claim 14, wherein the processor-executable instructions further cause the processing circuitry to provide the authorization by:

modifying a feature associated with the first component via the configuration code of an application of the plurality of applications based on a user requirement; and updating the application based on the configuration code.

16. The system of claim 15, wherein the processor-executable instructions further cause the processing circuitry to revert the modification in the feature associated with the first component from the application when the status of the first control setting is deactivated in the master map.

17. The system of claim 13, wherein the processor-executable instructions further cause the processing circuitry to deactivate the status of the first control setting by restricting the authorization to the each of the plurality of applications to access the first component.

18. The system of claim 10, wherein the processor-executable instructions further cause the processing circuitry to update the each of the plurality of applications by:

retrieving a latest version of a customized master map and a last saved version of the configuration code associated with the each of the plurality of applications from a respective database schema;

comparing the latest version of the customized master map and the last saved version of the configuration code associated with the each of the plurality of applications;

identifying one or more changes in the customized master map from the each of the plurality of applications based on the comparison, wherein the one or more changes is identified based on a deterministic algorithm and a contextual algorithm; and updating the each of the plurality of applications based on the one or more changes identified in the customized master map, wherein updating the each of the plurality of applications comprises synchronizing the configuration code associated with the each of the plurality of applications.

19. A non-transitory computer-readable medium storing computer-executable instructions for managing a plurality of applications, the stored computer-executable instructions, when executed by a processing circuitry, cause the processing circuitry to perform operations comprising:

receiving a first input for customization of a master map associated with the plurality of applications, wherein the master map comprises a plurality of components and a set of control settings for each of the plurality of components;

modifying, in the master map, a status of a first control setting for a first component based on the first input;

updating each of the plurality of applications based on the modified status of the first control setting in the master map; and modifying a configuration code associated with the each of the plurality of applications, based the update in each of the plurality of applications.

20. The non-transitory computer-readable medium of the claim 19, wherein the computer-executable instructions further configured for:

retrieving a latest version of a customized master map and a last saved version of the configuration code associated with the each of the plurality of applications from a respective database schema;

comparing the latest version of the customized master map and the last saved version of the configuration code associated with the each of the plurality of applications;

identifying one or more changes in the customized master map from the each of the plurality of applications based on the comparison, wherein the one or more changes is identified based on a deterministic algorithm and a contextual algorithm; and updating the each of the plurality of applications based on the one or more changes identified in the customized master map, wherein updating the each of the plurality of applications comprises synchronizing the configuration code associated with the each of the plurality of applications.

* * * * *